US010887046B2

(12) United States Patent
Nammi

(10) Patent No.: US 10,887,046 B2
(45) Date of Patent: Jan. 5, 2021

(54) PERFORMANCE BASED ON INFERRED USER EQUIPMENT DEVICE SPEED FOR ADVANCED NETWORKS

(71) Applicant: AT&T Intellectual Property I, L.P., Atlanta, GA (US)

(72) Inventor: SaiRamesh Nammi, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 10 days.

(21) Appl. No.: 16/383,534

(22) Filed: Apr. 12, 2019

(65) Prior Publication Data

US 2020/0145129 A1 May 7, 2020

Related U.S. Application Data

(60) Provisional application No. 62/754,746, filed on Nov. 2, 2018.

(51) Int. Cl.
*H04W 72/00* (2009.01)
*H04L 1/00* (2006.01)
(Continued)

(52) U.S. Cl.
CPC ......... *H04L 1/0026* (2013.01); *H04B 7/0486* (2013.01); *H04B 7/0639* (2013.01);
(Continued)

(58) Field of Classification Search
CPC ... H04L 1/0026; H04L 5/0082; H04L 5/0051; H04L 27/2649; H04W 4/027;
(Continued)

(56) References Cited

U.S. PATENT DOCUMENTS 9,496,973 B2  11/2016 Yiu et al.
9,735,842 B2   8/2017 Kim et al.
(Continued)

FOREIGN PATENT DOCUMENTS

WO    2011/130997 A1   10/2011

OTHER PUBLICATIONS

International Search Report and Written Opinion received for PCT Application Serial No. PCT/US2019/058978 dated Jan. 21, 2020, 34 pages.
(Continued)

*Primary Examiner* — Lan-Huong Truong
(74) *Attorney, Agent, or Firm* — Amin, Turocy & Watson, LLP

(57) ABSTRACT

Facilitating improved performance based on inferred user equipment device speed for advanced networks (e.g., 4G, 5G, 6G, and beyond) is provided herein. Operations of a system can comprise estimating a speed of a user equipment device based on a number of times that a layer indicator associated with the user equipment device changes during a defined period of time. The operations can also comprise selecting a multiple input transmission mode for a transmission to the user equipment device based on the speed of the user equipment device, resulting in a selected transmission mode. A closed loop multiple input transmission mode can be selected in response to the speed being below a defined speed. Alternatively, an open loop multiple input transmission mode can be selected in response to the speed being above the defined speed.

20 Claims, 14 Drawing Sheets

(51) Int. Cl.
  *H04L 5/00* (2006.01)
  *H04W 4/02* (2018.01)
  *H04B 7/0456* (2017.01)
  *H04B 7/06* (2006.01)
  *H04L 27/26* (2006.01)

(52) U.S. Cl.
  CPC .......... *H04L 5/0051* (2013.01); *H04L 5/0082* (2013.01); *H04L 27/2649* (2013.01); *H04W 4/027* (2013.01)

(58) Field of Classification Search
  CPC .. H04B 7/0486; H04B 7/0639; H04B 7/0689; H04B 7/0413
  See application file for complete search history.

(56) References Cited

U.S. PATENT DOCUMENTS

| | | | |
|---|---|---|---|
| 9,735,932 B2 | 8/2017 | Luo et al. | |
| 9,742,480 B1 | 8/2017 | Nammi et al. | |
| 9,762,456 B2 | 9/2017 | Mismar et al. | |
| 9,787,376 B2 | 10/2017 | Zhu et al. | |
| 9,866,295 B2 | 1/2018 | Kang et al. | |
| 9,866,298 B2 | 1/2018 | Lee et al. | |
| 9,999,073 B2 | 6/2018 | Nammi et al. | |
| 10,069,544 B2 | 9/2018 | Park et al. | |
| 2010/0284351 A1* | 11/2010 | Liang | H04B 7/0639 370/329 |
| 2012/0008587 A1* | 1/2012 | Lee | H04L 1/06 370/329 |
| 2013/0022142 A1 | 1/2013 | Nammi | |
| 2013/0195008 A1* | 8/2013 | Pelletier | H04B 7/0417 370/328 |
| 2014/0105158 A1* | 4/2014 | Kim | H04L 1/1854 370/329 |
| 2014/0133317 A1* | 5/2014 | Chen | H04B 7/0413 370/252 |
| 2017/0141826 A1 | 5/2017 | Kim et al. | |
| 2018/0054281 A1 | 2/2018 | Nammi | |
| 2018/0324815 A1 | 11/2018 | Nammi et al. | |
| 2018/0330611 A1 | 11/2018 | Jiang et al. | |
| 2019/0037568 A1* | 1/2019 | Zhang | H04B 7/0626 |
| 2020/0092916 A1* | 3/2020 | Lee | H04W 74/006 |
| 2020/0187159 A1* | 6/2020 | Ko | H04W 72/0466 |

OTHER PUBLICATIONS

AT&T, "CSI Reporting for supporting semi open loop and Closed loop MIMO Switching" 3GPP Draft RI-1712711 CSI vol. RAN WGI, No. Prague, Aug. 20, 2017, 4 pages.

* cited by examiner

US 10,887,046 B2

PERFORMANCE BASED ON INFERRED USER EQUIPMENT DEVICE SPEED FOR ADVANCED NETWORKS

CROSS-REFERENCE TO RELATED APPLICATIONS

This application claims the benefit of U.S. Provisional Application Ser. No. 62/754,746, filed Nov. 2, 2018, and entitled "INFERRING A UE SPEED TO IMPROVE PERFORMANCE OF AN NR MIMO SYSTEM," the entirety of which is expressly incorporated herein by reference.

TECHNICAL FIELD

This disclosure relates generally to the field of mobile communications and more specifically to determining a speed of a mobile device in order to improve performance of a multiple-input multiple-output system in an advanced wireless network.

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) standard for wireless communications. Unique challenges exist to provide levels of service associated with forthcoming 5G and other next generation network standards.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
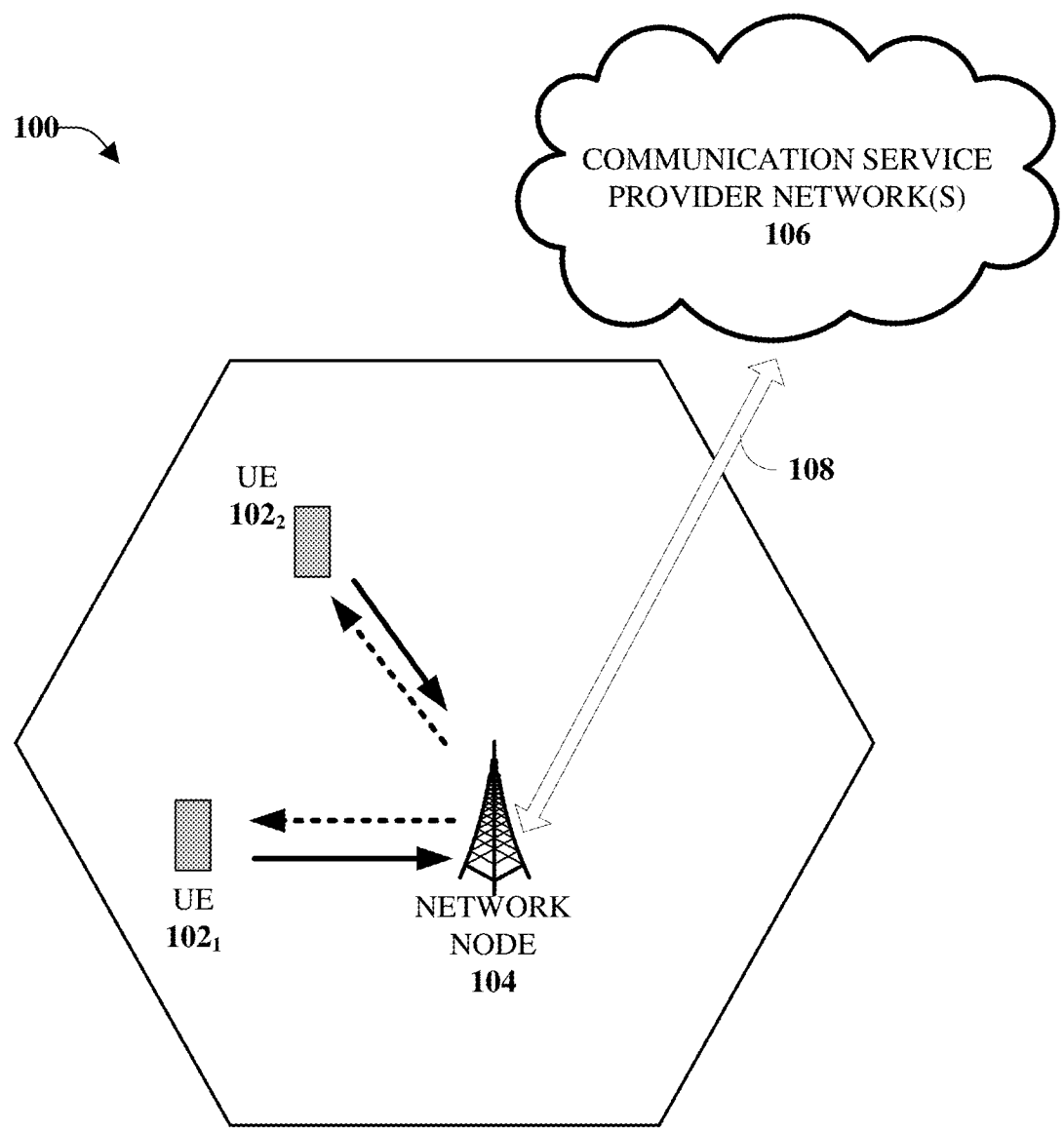
FIG. 1 illustrates an example, non-limiting, wireless communication system in accordance with one or more embodiments described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

Various embodiments disclosed herein provide for inferring or estimating the speed of a User Equipment (UE) device in order to dynamically switch between open loop and closed loop Multiple Input, Multiple Output (MIMO) transmission to the UE to improve performance. In some circumstances (e.g., communication links with high Signal to Interference Plus Noise Ratio (SINR)), there can be a large performance reduction if the speed of a UE is high when using closed loop MIMO. Therefore, by estimating or inferring the speed of the UE, the transmitter can select between closed loop or open loop MIMO to improve the performance and throughput, as discussed herein.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), Global System for Mobile Communications (GSM), Universal Mobile Telecommunications System (UMTS), Worldwide Interoperability for Microwave Access (WiMAX), enhanced General Packet Radio Service (enhanced GPRS), Third Generation Partnership Project (3GPP) Long Term Evolution (LTE), Third Generation Partnership Project 2 (3GPP2) Ultra Mobile Broadband (UMB), High Speed Packet Access (HSPA), Z-Wave, Zigbee and other 802.XX wireless technologies and/or legacy telecommunication technologies.

The various embodiments relate to improving performance based on inferred user equipment device speed for advanced networks. According to an embodiment, provided is a transmitter device that can comprise a processor and a memory. The memory can store executable instructions that, when executed by the processor, facilitate performance of operations. The operations can comprise estimating a speed of a user equipment device based on a number of times that a layer indicator associated with the user equipment device changes during a defined period of time. The operations can also comprise selecting a multiple input transmission mode for a transmission to the user equipment device based on the speed of the user equipment device, resulting in a selected transmission mode. A closed loop multiple input transmission mode can be selected in response to the speed being below a defined speed. Alternatively, an open loop multiple input transmission mode can be selected in response to the speed being above the defined speed. In an example, the defined speed can comprise a Doppler frequency of about 320 Hz, or another frequency.

In some implementations, the operations can comprise, in response to the selected transmission mode being the open loop multiple input transmission mode, transmitting an indication, to the user equipment device, that the transmission uses a precoder index that corresponds to a rank one precoder. Further to these implementations, the indication can be transmitted via radio resource control signaling.

According to some implementations, the operations can comprise, in response to the selected transmission mode being the open loop multiple input transmission mode, precoding a resource block of the transmission with a rank one precoder.

In some implementations, the operations can comprise, in response to the selected transmission mode being the open loop multiple input transmission mode, transmitting an indication, to the user equipment device. The indication can inform the user equipment device that there is no precoding matrix indicator associated with the transmission.

Estimating the speed of the user equipment device can comprise, according to some implementations, receiving a group of reports from the user equipment device over a defined time interval. Reports of the group of reports can comprise respective ranks selected by the user equipment device during time instances within the defined time interval.

According to some implementations, the operations can comprise determining a Doppler metric of the user equipment device based on respective layer indicators determined as a function of the respective ranks selected by the user equipment device. Further to these implementations, determining the Doppler metric can comprise determining a rate of change of the layer indicator over a time change determined based on the time instances within the defined time interval.

The operations can also comprise, according to some implementations, sending the transmission to the user equipment device using the selected transmission mode. Further, sending the transmission can comprise sending the transmission via a downlink control channel configured to operate according to a fifth generation wireless network communication protocol.

Another embodiment relates to a method that can comprise receiving, by a network device of a group of network devices of a communications network, a channel state information report at defined intervals over a period of time from a user equipment device, wherein the network device comprises a processor. The method can also comprise determining, by the network device, a number of different values of layer indicators in the channel state information report. Further, the method can comprise determining, by the network device, a speed of the user equipment device based on the number of different values of the layer indicators.

In some implementations, the method can comprise selecting, by the network device, a closed loop multiple input transmission mode for a transmission to the user equipment device based on a determination that the speed of the user equipment device fails to satisfy a defined speed. In some implementations, the method can comprise selecting, by the network device, an open loop multiple input transmission mode for a transmission to the user equipment device based on a determination that the speed of the user equipment device satisfies a defined speed.

In accordance with some implementations, the method can comprise implementing, by the network device, a first demodulation reference signal and a second demodulation reference signal based on a second determination that the speed of the user equipment device satisfies a second defined speed different from the first defined speed.

The method can also comprise, according to some implementations, sending, by the network device, a signal that instructs the user equipment device to use wide-band channel state information reporting based on the speed of the user equipment device being a first speed. In some implementations, the method can comprise sending, by the network device, a signal that instructs the user equipment device to use sub-band channel station information reporting based on the speed of the user equipment device being a first speed.

Further, the method can comprise determining, by the network device, a configuration mode for the user equipment device based on the speed of the user equipment device. The configuration mode can comprise a L1/L2 signaling configuration mode or a radio resource control configuration mode.

Another embodiment can relate to a machine-readable storage medium, that can comprise executable instructions that, when executed by a processor, facilitate performance of operations. The operations can comprise determining a speed of a communication device based on a number of times reported layer indicators associated with the communication device changes in a defined interval. Also, the operations can comprise selecting a multiple input transmission mode for utilization during a transmission to the communication device based on the speed of the communication device, resulting in a selected multiple input transmission mode. The selected multiple input transmission mode can be a closed loop multiple input transmission mode in response to the speed being below a defined speed. Alternatively, the selected multiple input transmission mode can be an open loop multiple input transmission mode in response to the speed being above the defined speed. Further, the operations can comprise facilitating a conveyance of the transmission to the communication device using the selected multiple input transmission mode.

According to some implementations, the operations can comprise receiving a group of reports from the communication device over a defined time interval. Reports of the group of reports can comprise respective ranks selected by the communication device during time instances within the defined time interval. Further to these implementations, the operations can comprise determining a Doppler metric of the communication device based on respective layer indicators of the reported layer indicators determined as a function of the respective ranks selected by the communication device. In an example, determining the Doppler metric of the communication device can comprise determining a rate of change between layer indicators of the reported layer indicators over a time change determined based on the time instances within the defined time interval.

Referring now to FIG. 1, illustrated is an example, non-limiting, wireless communication system 100 in accordance with one or more embodiments described herein. According to various embodiments, the wireless communication system 100 can comprise one or more User Equipment devices (UEs), illustrated as a first UE $102_1$ and a second UE $102_2$. It is noted that although only two UEs are illustrated for purposes of simplicity, the wireless communication system 100 can comprise a multitude of UEs.

The non-limiting term user equipment can refer to any type of device that can communicate with a network node in a cellular or mobile communication system. A UE can comprise one or more antenna panels having vertical and horizontal elements. UEs can be any user equipment device, such as a mobile phone, a smartphone, a cellular enabled laptop (e.g., comprising a broadband adapter), a tablet computer, a wearable device, a virtual reality (VR) device, a heads-up display (HUD) device, a smart car, a machine-type communication (MTC) device, and the like. Other examples of UEs comprise, but are not limited to, a target device, device to device (D2D), machine type UE or UE capable of machine to machine (M2M) communications, personal digital assistant (PDA), tablet, mobile terminals, laptop mounted equipment (LME), universal serial bus (USB) dongles enabled for mobile communications, a computer having mobile capabilities, a mobile device such as cellular phone, a laptop having laptop embedded equipment (LEE), such as a mobile broadband adapter, a tablet computer having a mobile broadband adapter, and the like. User equipment (e.g., the first UE $102_1$, the second UE $102_2$) can also comprise Internet of Things (IOT) devices that can communicate wirelessly. UEs can roughly correspond to the mobile station (MS) in Global System for Mobile communications (GSM) systems.

In various embodiments, the wireless communication system 100 is, or can comprise, a wireless communication network serviced by one or more wireless communication network providers. In example embodiments, a UE (e.g., the first UE $102_1$, the second UE $102_2$) can be communicatively coupled to the wireless communication network via a network node device 104. The network node (e.g., network node device) can communicate with the UEs, thus providing connectivity between the UEs and the wider cellular network. Further, the network node device 104 can facilitate wireless communication between the UEs and the wireless communication network (e.g., one or more communication service provider networks 106) via the network node device 104. In example embodiments, the UEs (e.g., the first UE 102$_1$, the second UE 102$_2$) can send and/or receive communication data via a wireless link to the network node device 104. The dashed arrow lines from the network node device 104 to the UEs (e.g., the first UE 102$_1$, the second UE 102$_2$) represent downlink (DL) communications and the solid arrow lines from the UE (e.g., the first UE 102$_1$, the second UE 102$_2$) to the network nodes (e.g., the network node device 104) represents uplink (UL) communications.

The wireless communication system 100 can further comprise one or more communication service provider networks 106 that can facilitate providing wireless communication services to various UEs, (e.g., the first UE 102$_1$, the second UE 102$_2$), via the network node device 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks, Wi-Fi service networks, broadband service networks, enterprise networks, cloud based networks, and the like.

The non-limiting term network node (e.g., network node device) can be used herein to refer to any type of network node serving one or more UEs and/or connected to other network nodes, network elements, other nodes, and/or other devices from which one or more UEs can receive a radio signal. In cellular radio access networks (e.g., Universal Mobile Telecommunications System (UMTS) networks), a network node can be referred to as Base Transceiver Stations (BTS), radio base station, radio network nodes, base stations, Node B, eNode B (e.g., evolved Node B), and so on. In 5G terminology, the node can be referred to as a gNode B (e.g., gNB) device.

Network nodes can also comprise multiple antennas for performing various transmission operations (e.g., Multiple Input, Multiple Output (MIMO) operations). A network node can comprise a cabinet and other protected enclosures, an antenna mast, and actual antennas. Network nodes can serve several cells, also called sectors, depending on the configuration and type of antenna. Examples of network nodes (e.g., network node device 104) can comprise but are not limited to: Node B devices, Base Station (BS) devices, Access Point (AP) devices, and Radio Access Network (RAN) devices. The network node device 104 can also comprise Multi-Standard Radio (MSR) radio node devices, comprising: an MSR BS, an eNode B, a network controller, a Radio Network Controller (RNC), a Base Station Controller (BSC), a relay, a donor node controlling relay, a Base Transceiver Station (BTS), a transmission point, a transmission node, a Remote Radio Unit (RRU), a Remote Radio Head (RRH), nodes in distributed antenna system (DAS), and the like.

For example, in at least one implementation, the wireless communication system 100 can be, or can include, a large scale wireless communication network that spans various geographic areas. According to this implementation, the one or more communication service provider networks 106 can be, or can include, the wireless communication network and/or various additional devices and components of the wireless communication network (e.g., additional network devices and cell, additional UEs, network server devices, etc.).

The network node device 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also comprise wireless link components, such as but not limited to, line-of-sight (LOS) or non-LOS links which can include terrestrial air-interfaces or deep space links (e.g., satellite communication links for navigation).

The wireless communication system 100 can employ various cellular systems, technologies, and modulation modes to facilitate wireless radio communications between devices (e.g., the UEs (e.g., the first UE 102$_1$, the second UE 102$_2$) and the network node device 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000, and so on.

For example, the wireless communication system 100 can operate in accordance with Global System for Mobile Communications (GSM), Universal Mobile Telecommunications Service (UMTS), Long Term Evolution (LTE), LTE frequency division duplexing (LTE FDD), LTE Time Division Duplexing (TDD), High Speed Packet Access (HSPA), Code Division Multiple Access (CDMA), Wideband CDMA (WCMDA), CDMA2000, Time Division Multiple Access (TDMA), Frequency Division Multiple Access (FDMA), Multi-Carrier Code Division Multiple Access (MC-CDMA), Single-Carrier Code Division Multiple Access (SC-CDMA), Single-Carrier FDMA (SC-FDMA), Orthogonal Frequency Division Multiplexing (OFDM), Discrete Fourier Transform Spread OFDM (DFT-spread OFDM) Single Carrier FDMA (SC-FDMA), Filter Bank Based Multi-Carrier (FBMC), Zero Tail DFT-spread-OFDM (ZT DFT-s-OFDM), Generalized Frequency Division Multiplexing (GFDM), Fixed Mobile Convergence (FMC), Universal Fixed Mobile Convergence (UFMC), Unique Word OFDM (UW-OFDM), Unique Word DFT-spread OFDM (UW DFT-Spread-OFDM), Cyclic Prefix OFDM CP-OFDM, resource-block-filtered OFDM, Wi Fi, WLAN, WiMax, and the like.

However, various features and functionalities of the wireless communication system 100 are particularly described wherein the devices (e.g., the UEs (e.g., the first UE 102$_1$, the second UE 102$_2$) and the network node device 104) of the wireless communication system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to MultiCarrier (MC) or Carrier Aggregation (CA) operation of the UE. The term carrier aggregation is also called (e.g. interchangeably called) "multi-carrier system," "multi-cell operation," "multi-carrier operation," "multi-carrier" transmission and/or reception. Note that some embodiments are also applicable for Multi RAB (radio bearers) on some carriers (that is data plus speech is simultaneously scheduled).

In various embodiments, the wireless communication system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs).

MIMO is an advanced antenna technique to improve the spectral efficiency and thereby boosting the overall system capacity. The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit and receive diversity.

MIMO systems can significantly increase the data carrying capacity of wireless systems. MIMO can be used for achieving diversity gain, spatial multiplexing gain and beamforming gain. For these reasons, MIMO is an integral part of the third and fourth generation wireless systems. In addition, massive MIMO systems are currently under investigation for 5G systems.

Figure 2:
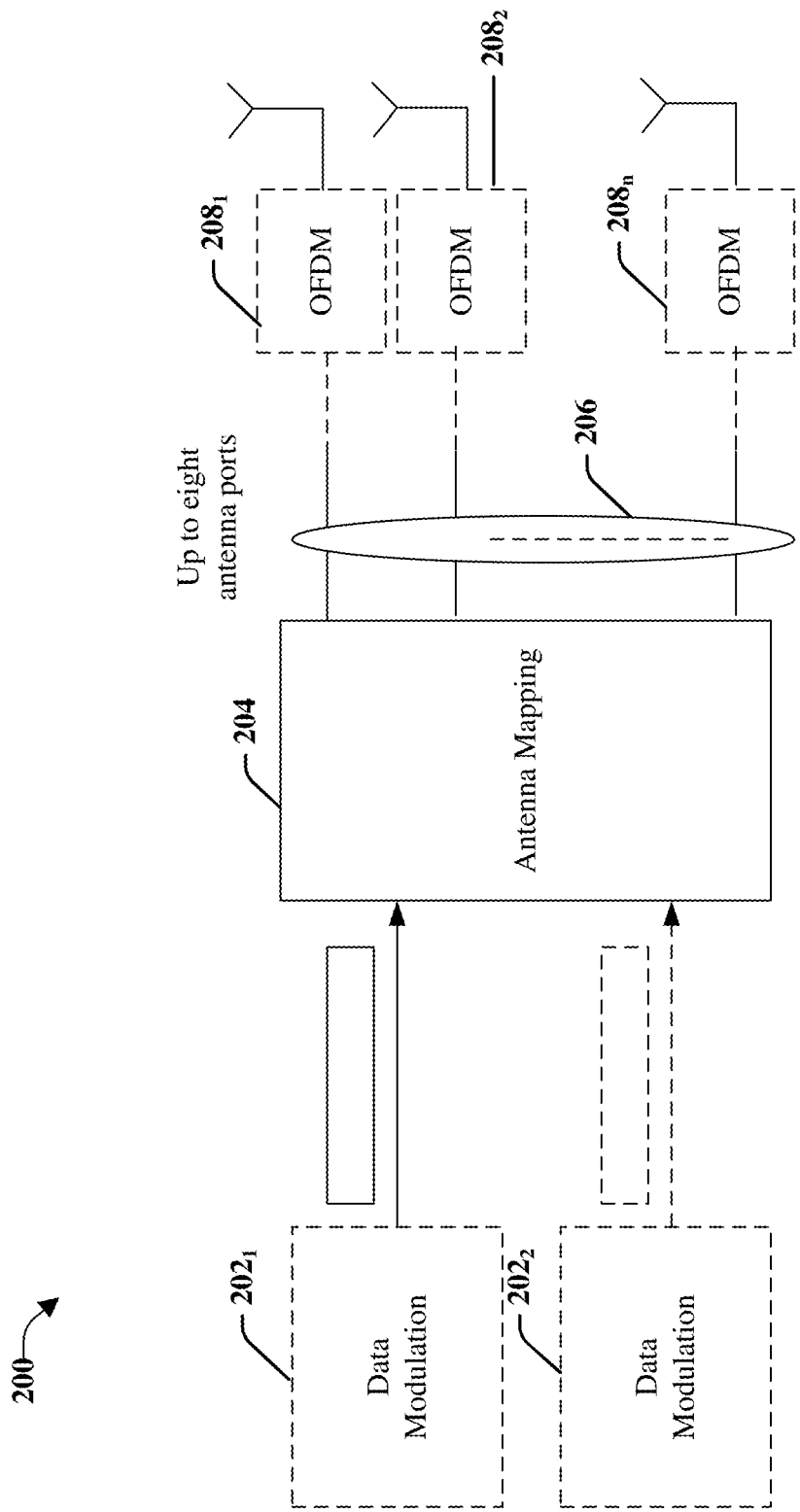
FIG. 2 illustrates an example schematic system block diagram of a fourth generation multiple input multiple output transmission using up to two code words of encoded data, mapped to up to eight antenna ports according to one or more embodiments.

FIG. 2 illustrates an example schematic system block diagram 200 of a 4G MIMO transmission using up to two code words of encoded data, mapped to up to eight antenna ports according to one or more embodiments. A similar structure can be used for 5G systems with more antenna ports. Antenna mapping 204, in general, can be described as a mapping from the output of a data modulation $202_1$, $202_2$ to the different antenna ports 206. The input to the antenna mapping 204 can comprise modulation symbols (QPSK, 16QAM, 64QAM, 256QAM) corresponding to the one or two transport blocks. To be more specific, there can be one transport block per transmit time interval (TTI) except for spatial multiplexing, in which case there can be up to two transport blocks per TTI. The output of the antenna mapping can be a set of symbols for each antenna port. The symbols of each antenna port can be subsequently applied to the OFDM modulator $208_1$, $208_2$ . . . $208_n$ (e.g., mapped to the basic OFDM time-frequency grid corresponding to that antenna port).

Figure 3:
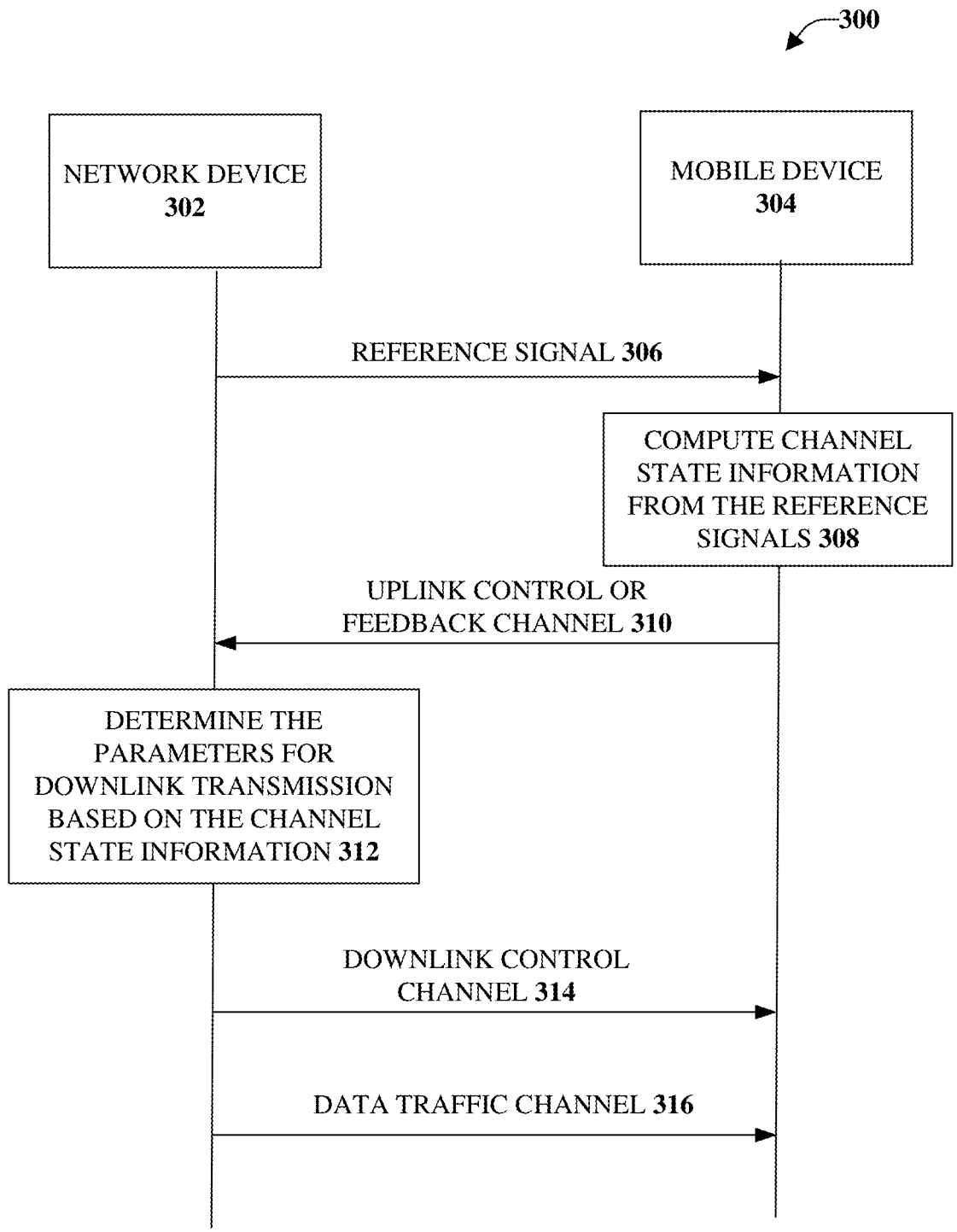
FIG. 3 illustrates an example, non-limiting, message sequence flow chart that can facilitate downlink data transfer in accordance with one or more embodiments described herein.

FIG. 3 illustrates an example, non-limiting, message sequence flow chart 300 that can facilitate downlink data transfer in accordance with one or more embodiments described herein. The message sequence flow chart 300 can be utilized for new radio, as discussed herein. As illustrated, the message sequence flow chart 300 represents the message sequence between a network device 302 (e.g., a gNB) and a mobile device 304. As used herein, the term "network device 302" can be interchangeable with (or can include) a network, a network controller or any number of other network components. One or more pilot signals and/or reference signals 306 can be transmitted from the network device 302 to the mobile device 304. The one or more pilot signals and/or reference signals 306 can be cell specific and/or user equipment specific signals. The one or more pilot signals and/or reference signals 306 can be beamformed or non-beamformed.

Based on the one or more pilot signals and/or reference signals 306, the mobile device 304 can compute the channel estimates and can compute the one or more parameters needed for Channel State Information (CSI) reporting, as indicated at 308. The CSI report can comprise, for example, Channel Quality Indicator (CQI), Precoding Matrix Index (PMI), Rank Information (RI), Channel State Information Reference Signal (CSI-RS) Resource Indicator (CRI the same as beam indicator), and so on, or any number of other types of information.

The CSI report can be sent from the mobile device 304 to the network device 302 via a feedback channel (e.g., an uplink control or feedback channel 310). The CSI report can be sent based on a request from the network device 302, a-periodically, and/or the mobile device 304 can be configured to report periodically or at another interval.

The network device 302, which can comprise a scheduler (e.g., a scheduler component), can use the CSI report for choosing the parameters for scheduling of the mobile device 304 (e.g., a particular mobile device). For example, as indicated at 312, the network device 302 can choose the parameters for downlink transmission based on the channel state information. The parameters for downlink transmission can include, but are not limited to: Modulation and Coding Scheme (MCS), power, Physical Resource Blocks (PRBs), and so on.

The network device 302 can send the scheduling parameters to the mobile device 304 via a downlink control channel (e.g., a downlink control channel 314). Upon or after the scheduling parameter information is transmitted, the actual data transfer can take place from the network device 302 to the mobile device 304 over a data traffic channel (e.g., data traffic channel 316).

Downlink reference signals are predefined signals occupying specific resource elements within the downlink time-frequency grid. There are several types of downlink reference signals that are transmitted in different ways and used for different purposes by the receiving terminal (e.g., the mobile device 304). For example, downlink reference signals can include CSI reference signals (CSI-RS) and/or demodulation reference signals (DM-RS).

CSI reference signals are specifically intended to be used by terminals (e.g., the mobile device 304) to acquire channel-state information (CSI) and beam specific information (beam RSRP). In 5G, for example, CSI-RS is mobile device specific. Therefore, the CSI-RS can have a significantly lower time/frequency density.

Demodulation reference signals (also sometimes referred to as User Equipment (UE)-specific reference signals), are specifically intended to be used by terminals for channel estimation for the data channel. The label "UE-specific" relates to the fact that each demodulation reference signal is intended for channel estimation by a single terminal. That specific reference signal is then only transmitted within the resource blocks assigned for data traffic channel transmission to that terminal.

Other than the above-mentioned reference signals, there are other reference signals, namely phase tracking and tracking and sounding reference signals, which can be used for various purposes.

An uplink control channel carries information about Hybrid Automatic Repeat Request (HARQ-ACK) information corresponding to the downlink data transmission, and channel state information. The channel state information can comprise CSI-RS Resource Indicator (CRI), Rank Indicator (RI), Channel Quality Indicator (CQI), Precoding Matrix Indicator (PMI), Layer Indicator, and so on. The CSI can be divided into at least two categories. For example, a first category can be for subband and a second category can be for wideband. The configuration of subband and/or wideband CSI reporting can be performed through Radio Resource Control (RRC) signaling as part of CSI reporting configuration. Table 1 below illustrates example contents of an example CSI report for both wideband and subband. Specifically, Table 1 illustrates the contents of a report for PMI format indicator=Wideband, CQI format indicator=wideband and for PMI format indicator=subband, CQI format indicator=subband.

| PMI-FormatIndicator = widebandPMI and CQI-FormatIndicator = widebandCQI | PMI-FormatIndicator = subbandPMI or CQI-FormatIndicator = subbandCQI | | |
|---|---|---|---|
| | | CSI Part II | |
| | CSI Part I | wideband | Subband |
| CRI | CRI | Wideband CQI for the second TB | Subband differential CQI for the second TB of all even subbands |
| Rank Indicator | Rank Indicator | PMI wideband (X1 and X2) | PMI subband information fields $X_2$ of all even subbands |
| Layer Indicator | Layer Indicator | — | Subband differential CQI for the second TB of all odd subbands |
| PMI wideband (X1 and X2) | Wideband CQI | — | PMI subband information fields $X_2$ of all odd subbands |
| Wideband CQI | Subband differential CQI for the first TB | — | — |

It is noted that for NR, the subband can be defined according to the bandwidth part of the Orthogonal Frequency-Division Multiplexing (OFDM) in terms of PRBs as shown in Table 2 below, which illustrates example, non-limiting, configurable subband sizes. The subband configuration can also be performed through RRC signaling.

TABLE 2

| Carrier bandwidth part (PRBs) | Subband Size (PRBs) |
|---|---|
| <24 | N/A |
| 24-72 | 4, 8 |
| 73-144 | 8, 16 |
| 145-275 | 16, 32 |

The downlink control channel (PDCCH) can carry information about the scheduling grants. This can comprise a number of MIMO layers scheduled, transport block sizes, modulation for each codeword, parameters related to HARQ, subband locations, and so on. It is noted that all Downlink Control Information (DCI) formats might not use and/or might not transmit all the information as shown above. In general, the contents of PDCCH depends on transmission mode and DCI format.

In some cases, the following information can be transmitted by means of the downlink control information (DCI) format: carrier indicator, identifier for DCI formats, bandwidth part indicator, frequency domain resource assignment, time domain resource assignment, Virtual Resource Block (VRB)-to-PRB mapping flag, PRB bundling size indicator, rate matching indicator, Zero Power (ZP) CSI-RS trigger, modulation and coding scheme for each Transport Block (TB), new data indicator for each TB, redundancy version for each TB, HARQ process number, downlink assignment index, Transmit Power Control (TPC) command for uplink control channel, Physical Uplink Control Channel (PUCCH) resource indicator, Physical Downlink Shared Channel (PDSCH)-to-HARQ feedback timing indicator, antenna port(s), transmission configuration indication, Sounding Reference Signal (SRS) request, Code Block Group (CBG) transmission information, CBG flushing out information, Demodulation Reference Signal (DMRS) sequence initialization, and so on.

The performance of closed loop MIMO systems, such as MIMO systems for 5G, can degrade at high UE speeds. The performance degradation is severe at high Signal to Noise Ratio (SNR) users. This is because, at high SNR, there is a probability of full or close to full rank is high. In addition, for high rank systems, the impact due to mismatch between the transmitter and receiver channel qualities can be severe.

Figure 4:
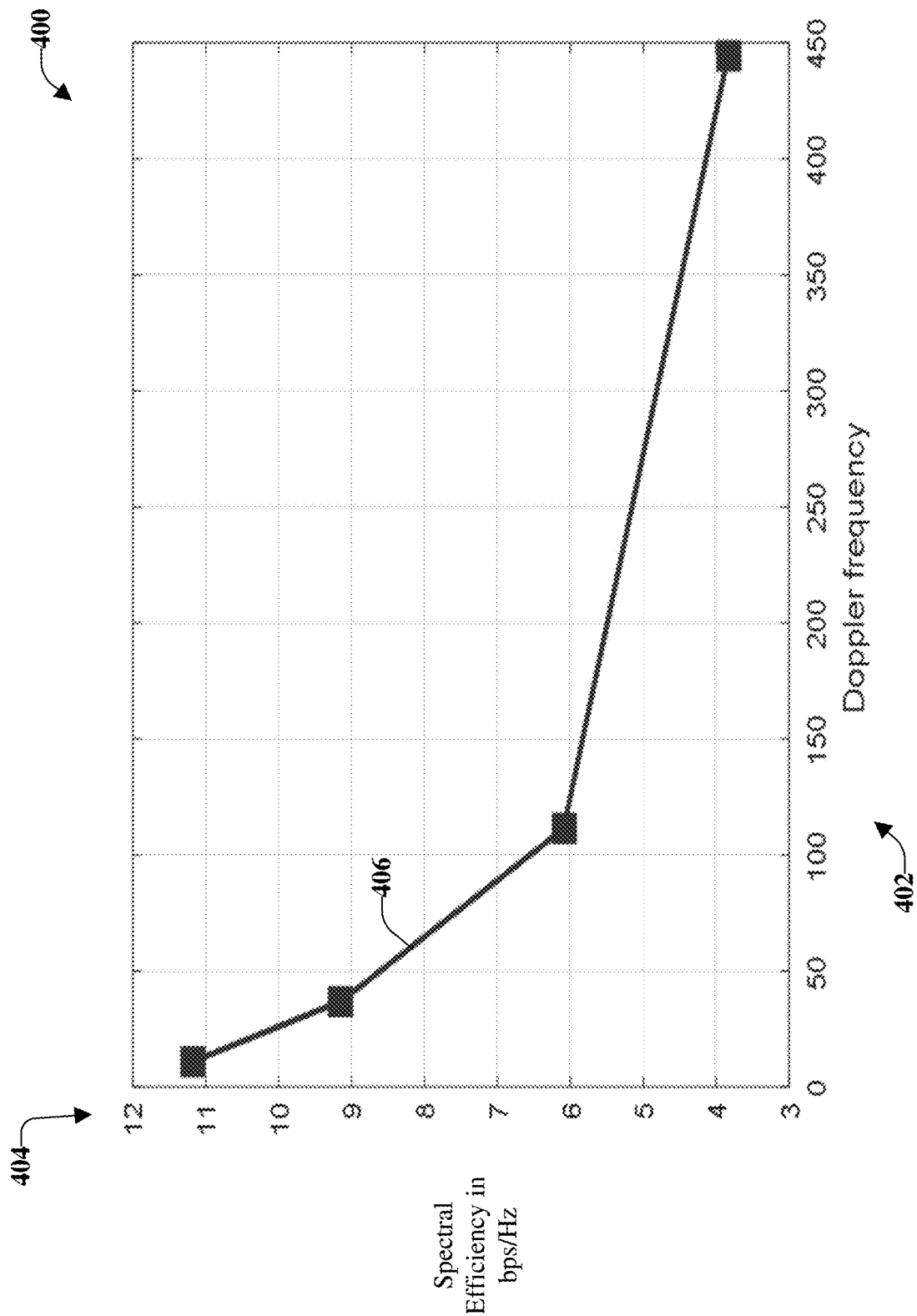
FIG. 4 illustrates an example, non-limiting, chart of spectral efficiency of closed loop multiple input multiple output as a function of Doppler frequency in accordance with one or more embodiments described herein.

FIG. 4 illustrates an example, non-limiting, chart 400 of spectral efficiency of closed loop MIMO as a function of Doppler frequency according to an aspect. Illustrated on the horizontal axis is Doppler frequency 402, and on the horizontal axis is spectral efficiency 404 in bits per second per Hertz (bps/Hz). Specifically, illustrated is the spectral efficiency for a closed loop MIMO system with four transmit and four receive antennas at high SNR of 25 dB for different UE speeds (shown in Doppler frequency 402). It can be determined from line 406 in FIG. 4 that, as the UE speed is increased, the throughput decreases due to the outdated channel state information.

A solution to avoid the degradation of the performance of closed loop MIMO systems is to switch to open loop MIMO system once the UE crosses the threshold (Doppler). The open loop MIMO systems can include Random Precoding with one antenna port. In the precoding with one antenna port procedure, the precoder cycling, which is transparent to the UE, is considered. The rank 1 precoders are applied at the resource block (RB) level. The DM-RS pattern designed for transmission scheme 1 can be reused for the precoding with one antenna port procedure.

Figure 5:
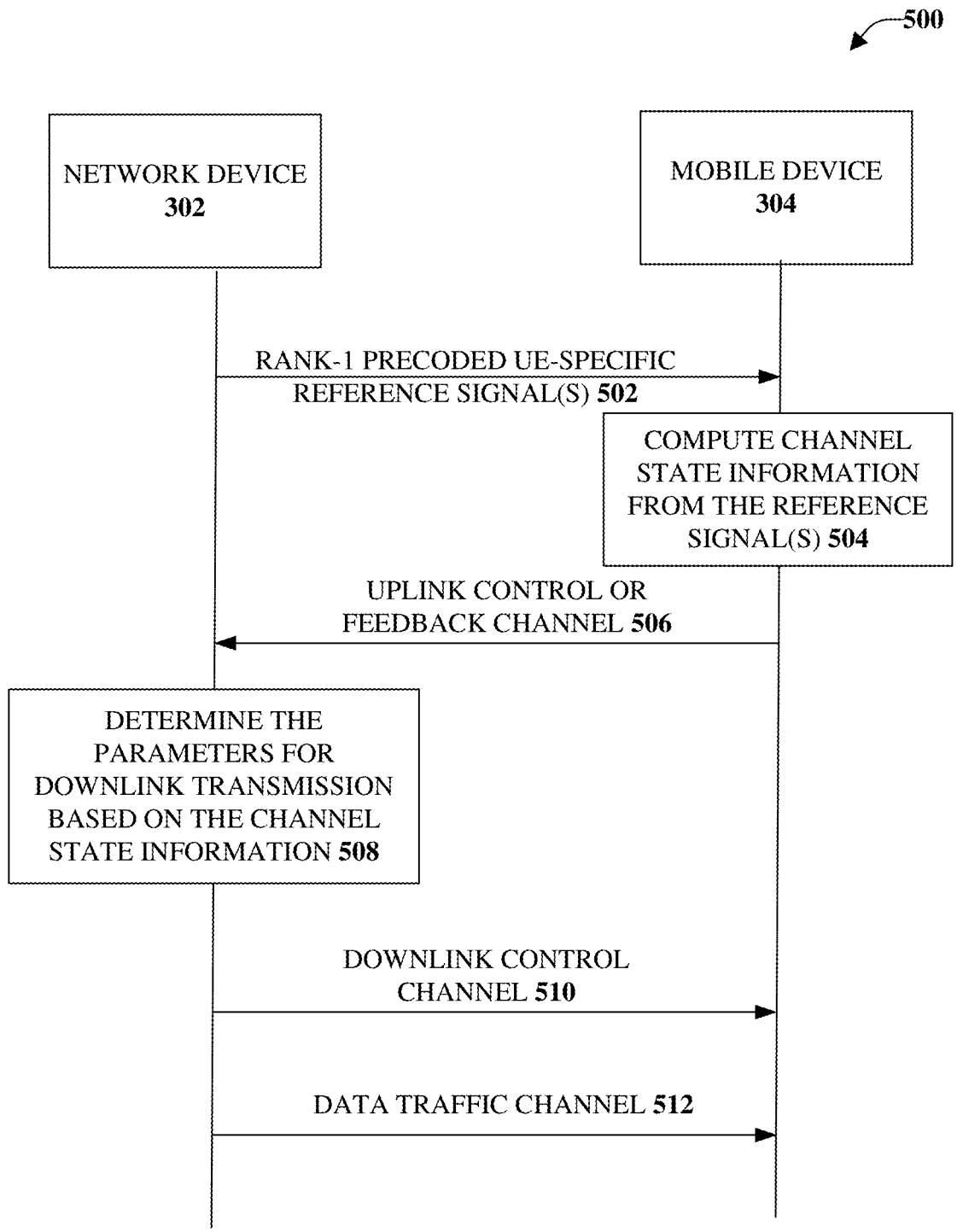
FIG. 5 illustrates an example, non-limiting, message sequence chart 500 that can facilitate downlink data transfer in 5G systems with Rank-1 Precoder cycling in accordance with one or more embodiments described herein.

FIG. 5 illustrates an example, non-limiting, message sequence chart 500 that can facilitate downlink data transfer in 5G systems with Rank-1 Precoder cycling in accordance with one or more embodiments described herein. Rank-1 Precoder cycling, can also be referred to as transmission scheme 2 (or transmission protocol 2). Repetitive description of like elements employed in other embodiments described herein is omitted for sake of brevity.

In transmission protocol 2, the CSI-RS is precoded at the RB level from the gNodeB (e.g., the network device 302) and transmitted to the mobile device 304. For example, rank-1 precoded UE-specific (or mobile device-specific) reference signals 502 can be transmitted. From the precoded reference signals, the mobile device 304 can compute the channel estimates and can compute the parameters needed for CSI reporting, at 504. The CSI report can include, for example, Channel Quality Indicator (CQI).

The mobile device 304 can send the CSI report to the network device 302 via an uplink control or feedback channel 506. The CSI report can be sent on a periodic basis, on an on-demand based CSI (e.g., aperiodic CSI reporting), or at other times. The gNodeB scheduler (e.g., a scheduler of the network device 302) can use this information in determining the parameters for scheduling of this particular mobile device, at 508. The network device 302 can send the scheduling parameters to the mobile device 304 in the downlink control channel 510 (e.g., PDCCH). Upon or after sending the downlink control channel, actual data transfer can take place from the network device 302 to the mobile device 304 (e.g., via a data traffic channel 512).

Figure 6:
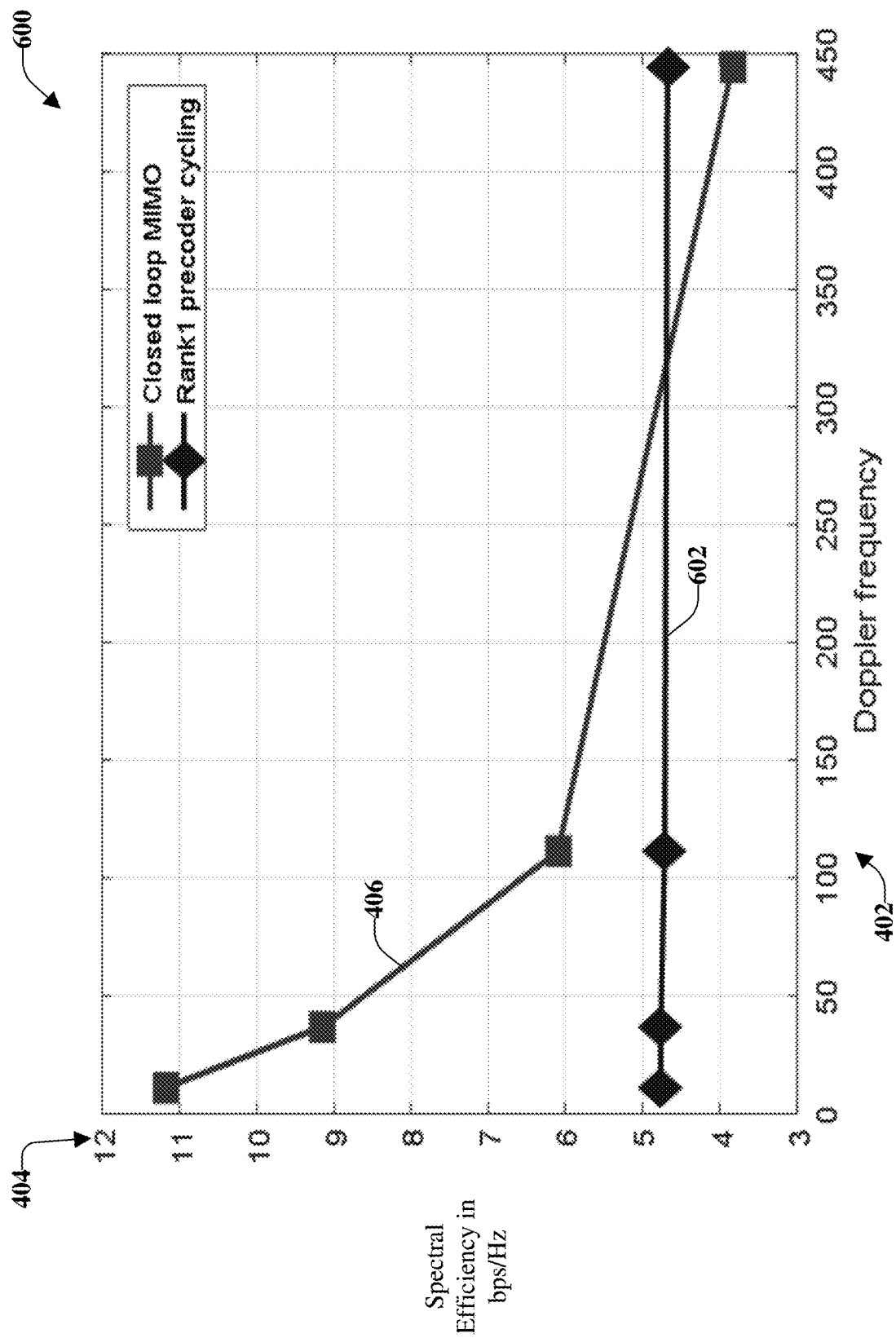
FIG. 6 illustrates an example, non-limiting, chart of spectral efficiency performance of new radio multiple input multiple output as a function of Doppler frequency in accordance with one or more embodiments described herein.

FIG. 6 illustrates an example, non-limiting, chart 600 of spectral efficiency performance of NR MIMO as a function of Doppler frequency in accordance with one or more embodiments described herein. Repetitive description of like elements employed in other embodiments described herein is omitted for sake of brevity.

As illustrated, the performance of closed loop MIMO system decreases as the UE moves with a higher speed, as indicated by line 406. Alternatively, the rank-1 precoder cycling is almost constant as the precoder changes at group of RB level, as indicated by line 602. For example, at low doppler frequencies (indicating a slow moving UE) the performance of closed loop MIMO can be much higher than open loop MIMO. At higher doppler frequencies, however, open loop can be preferred. As depicted in the chart 600, as the doppler frequency 402 increases, the spectral efficiency 404 of closed loop MIMO (line 406) decreases and at around 320 Hz. The open loop MIMO can have a higher spectral efficiency.

The performance of closed loop MIMO systems, including MIMO systems for 5G, degrades at high UE speeds. The performance degradation can result in increased high SINR users (e.g., experienced through respective UEs). This is because at high SINR, the probability of full or close to full rank is high. In addition, for high rank systems, the impact due to mismatch (e.g., difference in channel state information) between the transmitter and receiver channel qualities is severe.

As illustrated in FIG. 6, as the UE speed increases, the throughput decreases due to the outdated channel state information. A solution to avoid the degradation of the performance in closed loop MIMO systems is to switch to an open loop MIMO system when the speed increases past, or around, a defined doppler frequency. The open loop MIMO systems can be Random Precoding with one antenna port, for example. In this arrangement, the precoder cycling, which is transparent to the UE, is considered. The rank 1 precoders are applied at the RB level. The DM-RS pattern designed for transmission scheme 1 can be reused for this arrangement. Further, in this arrangement, the CSI-RS is precoded at the RB level from the gNodeB and transmitted from the network. From the precoded reference signals, the UE computes the channel estimates then computes the parameters needed for CSI reporting. The CSI report can include, for example, channel quality indicator (CQI).

Figure 7:
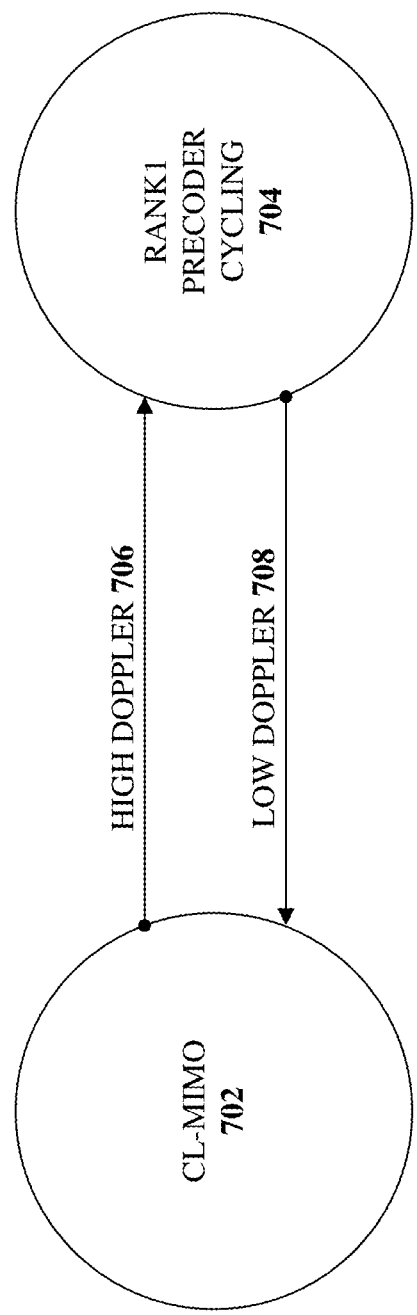
FIG. 7 illustrates an example, non-limiting, conceptual diagram of a method for improving performance of an advanced network multiple input multiple output system in accordance with one or more embodiments described herein.

FIG. 7 illustrates an example, non-limiting, conceptual diagram 700 of a method for improving performance of an advanced network MIMO system in accordance with one or more embodiments described herein.

Illustrated are a CL-MIMO representation 702 and a Rank1 Precoder Cycling representation 704. When the network device detects the UE is moving with a high Doppler frequency 706 (e.g., greater than a threshold (Dth)), the network device communicates to the UE to change to rank-1 precoder cycling. For example, change from the CL-MIMO representation 702 to the Rank1 Precoder Cycling representation 704. With rank-1 precoder cycling, the network device can use random precoders at the transmission side. The rank-1 precoder cycling can be applied at the RB level and/or at the resource element (RE) level. The main idea of this rank-1 random precoding is that when rank equals to one, the reliability of the transmitted signal increases, thereby reducing the CSI estimation error due to the high Doppler shift between the transmitter and the receiver.

In a similar manner, when the network device detects that the UE changed its speed and is moving at a slow speed (e.g., low doppler 708), the network device can inform the UE to change to closed loop MIMO mode and to report CSI as usual (e.g., according to traditional reporting methods). For example, change from the Rank1 Precoder Cycling representation 704 to the CL-MIMO representation 702.

Since estimating the Doppler metric can be used for determining when to transition between the closed loop MIMO and Rank1 precoder cycling (e.g., open loop MIMO), the network device can estimate the UE speed accurately without causing additional feedback channel overhead. According to an embodiment, the UE can report the best layer index as part of CSI. The layer index corresponds to the best SINR for the rank computed. For example, if the UE is reporting that the best rank is 4, then the layer index can be either 1 to 4. For example, at time instance T1, the UE reports LI=2, then, for example, at time instance T2 the UE reports again LI=2, similarly, at time T3 LI=2, then the network device can infer that the speed of the UE is very low and can use closed loop MIMO system for transmission.

In another example, if the value of LI changes fast, then the network device can infer the speed of the UE is very high. Hence, the UE can transmit the signal with rank-1 precoder cycling. Let $\Delta LI$ represents the rate of change of LI over K, and let $\Delta T$ indicate the time change, then the Doppler metric can be computed as $Dm = \Delta LI/\Delta T$.

Note that RB level Rank-1 precoder cycling is transparent to the UE. That is, the UE does not need to know if the network device wants to apply rank-1 precoder cycling. That is, there is no need to signal the transmission mode change from the network device. However, for this method to work without explicit indication to the UE, while allowing the network device to use closed loop MIMO, the network device can inform the UE to Report only rank-1. This can be achieved by the use of codebook subset restriction (CBSR), which can be either RRC signaling or a physical layer signaling by setting only those precoder indices which correspond to rank equal to one. Alternatively, the network device can select a setting that notifies the UE to not report PMI. The UE can be notified of this setting through explicit signaling, which can be either by RRC or physical layer. By informing this setting to the UE, there is no need to compute the PMI and the UE informs the network only about CQI.

Figure 8:
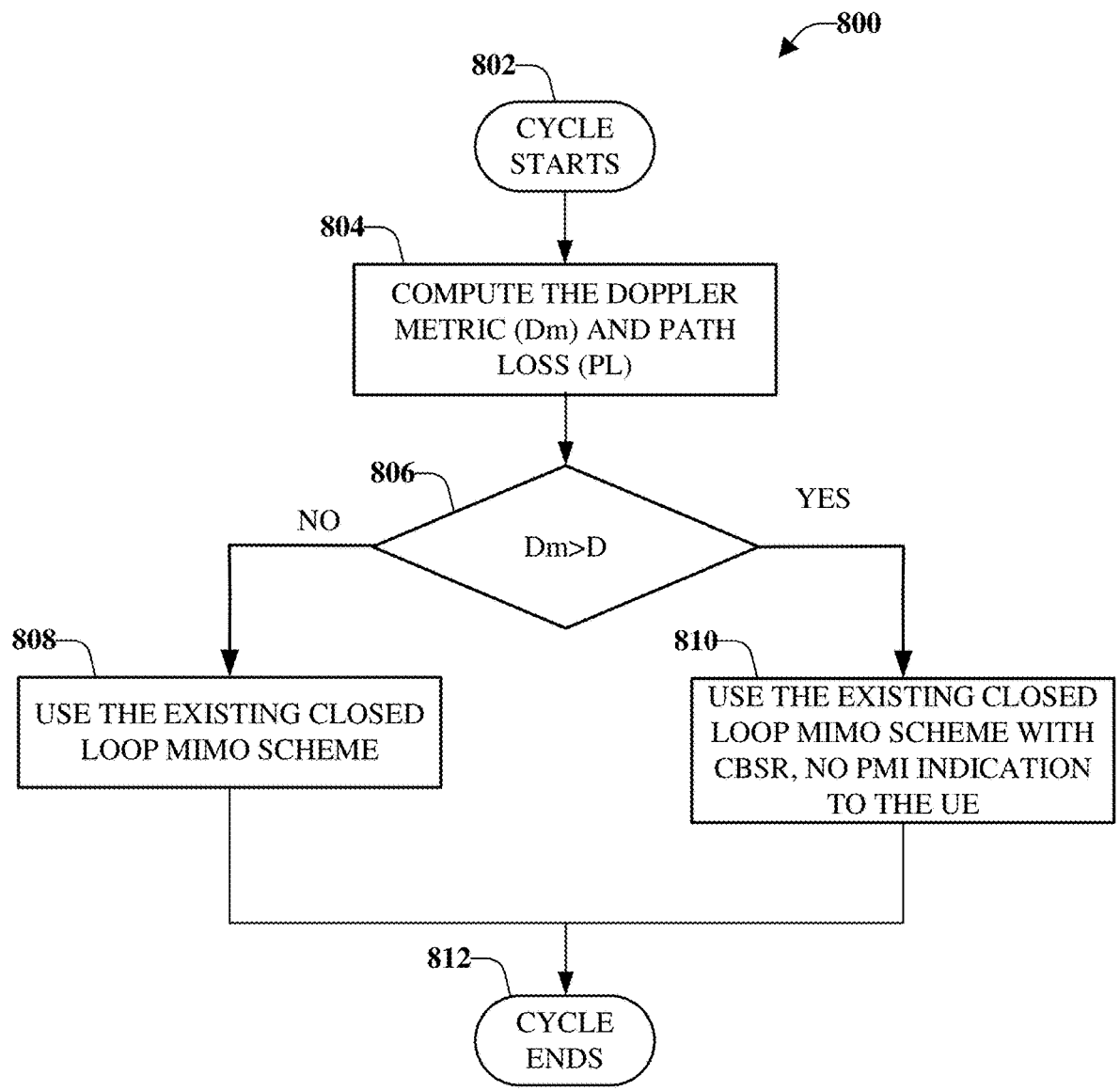
FIG. 8 illustrates an example, non-limiting, block diagram of a decision tree for selecting closed loop multiple input multiple output or open loop multiple input multiple output in accordance with one or more embodiments described herein.

Turning now to FIG. 8, illustrated is an example, non-limiting, block diagram 800 of a decision tree for selecting closed loop MIMO or open loop MIMO in accordance with one or more embodiments described herein.

At 802, the cycle starts, and the transmitter can compute the doppler metric (Dm) and path loss (PL) at 804. A determination can be made at 806, whether the Dm is above a defined Doppler D. For example, the defined Doppler D can be around 320 Hertz (Hz), however, the disclosed aspects are not limited to this value. If the determination is that the Dm is not more than the D ("NO"), at 808, the existing closed loop MIMO procedure can be used. Alternatively, if the determination at 806 is that the Dm is more than the D ("YES"), at 810, the existing closed loop MIMO procedure with CBSR can be used, and no PMI indication is provided to the UE. The cycle stops at 812, or can continue at 804 for a computation of another Dm and PL.

Figure 9:
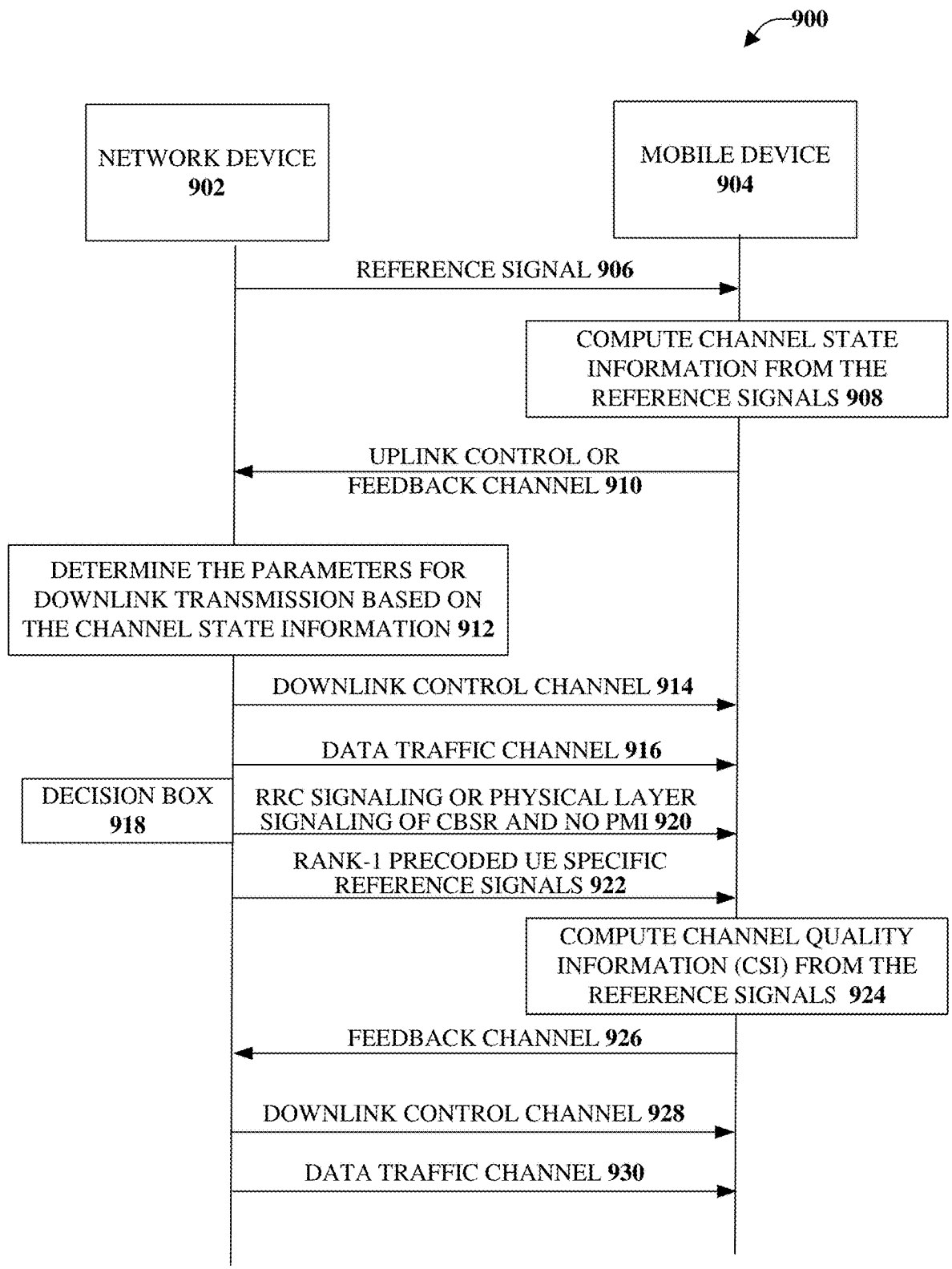
FIG. 9 illustrates an example, non-limiting, message sequence chart in accordance with one or more embodiments described herein.

Turning now to FIG. 9, illustrated is an example, non-limiting, message sequence chart 900 in accordance with one or more embodiments described herein. Repetitive description of like elements employed in other embodiments described herein is omitted for sake of brevity.

Illustrated are a network device 902 (e.g. a gNB, the network device 302) and a mobile device 904 (e.g., the mobile device 304). The network device 902 can send cell specific/UE specific reference signals 906 to the mobile device 904. As indicated at 908, the mobile device 904 can compute channel state information from the reference signals, including a layer indicator. The mobile device 904 can send the CSI to the network device 902 via a feedback channel 910. At 912, the network device 902 can determine the parameters for the DL transmission including modulation and coding scheme, power, PRBs, and so on. The network device 902 can inform the mobile device 904 of the parameters via a downlink control channel 914. Further, the network device 902 can transmit data to the mobile device 904 via a data traffic channel 916 (e.g., PDSCH).

As illustrated by the decision box 918, the network device 902 can estimate the speed of the mobile device 904 based on the layer indicator changing in a defined period. Further, the network device 902 can determined to send RRC signaling or physical layer signaling of CBSR and no PMI at 920. Then, the network device 902 can transmit a rank 1 precoded UE specific reference signal at 922.

The mobile device 904 can compute channel quality information from the reference signals at 924. The CSI can be fed back to the network device 902 via a feedback channel 926. The network device 902 can transmit via a downlink control channel 928 and a data traffic channel 930.

Figure 10:
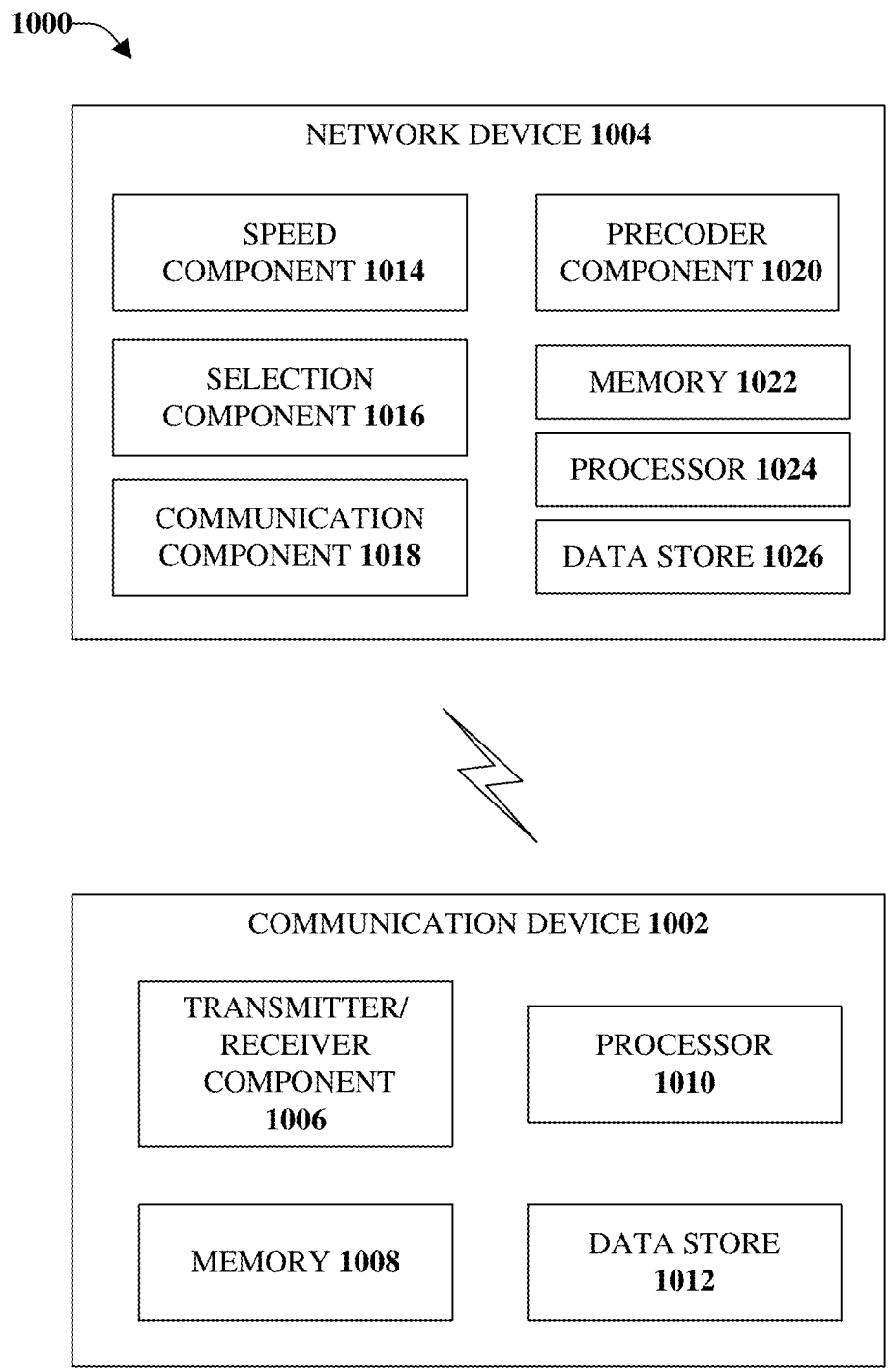
FIG. 10 illustrates an example, non-limiting, system for improving performance based on inferred user equipment device speed for advanced networks in accordance with one or more embodiments described herein.

FIG. 10 illustrates an example, non-limiting, system 1000 for improving performance based on inferred user equipment device speed for advanced networks in accordance with one or more embodiments described herein. Aspects of systems (e.g., the system 1000 and the like), apparatuses, or processes explained in this disclosure can constitute machine-executable component(s) embodied within machine(s) (e.g., embodied in one or more computer readable mediums (or media) associated with one or more machines). Such component(s), when executed by the one or more machines (e.g., computer(s), computing device(s), virtual machine(s), and so on) can cause the machine(s) to perform the operations described.

In various embodiments, the system 1000 can be any type of component, machine, device, facility, apparatus, and/or instrument that comprises a processor and/or can be capable of effective and/or operative communication with a wired and/or wireless network. Components, machines, apparatuses, devices, facilities, and/or instrumentalities that can comprise the system 1000 can include tablet computing devices, handheld devices, server class computing machines and/or databases, laptop computers, notebook computers, desktop computers, cell phones, smart phones, consumer appliances and/or instrumentation, industrial and/or commercial devices, hand-held devices, digital assistants, multimedia Internet enabled phones, multimedia players, and the like.

As illustrated in FIG. 10, the system 1000 can include a communication device 1002 and a network device 1004. The network device 1004 can be included in a group of network devices of a wireless network. Although only a single communication device and a single network device are shown and described, the various aspects are not limited to this implementation. Instead, multiple communication devices and/or multiple network devices can be included in a communications system.

The communication device 1002 can include a transmitter/receiver component 1006, at least one memory 1008, at least one processor 1010, and at least one data store 1012. The network device 1004 can include a speed component 1014, a selection component 1016, a communication component 1018, a precoder component 1020, at least one memory 1022, at least one processor 1024, and at least one data store 1026.

The transmitter/receiver component 1006 can send, to the network device 1004, one or more layer indicators associated with the communication device 1002. The layer indicators can be received, at the network device 1004, via the communication component 1018. The layer indicators can be sent over time. The speed component 1014, can estimate a speed of the communication device 1002 based on a number of times that a layer indicator associated with the user equipment device changes during a defined period of time.

In accordance with some implementations, to estimate the speed, the speed component 1014 can receive (e.g., via the communication component 1018) a group of reports from the user equipment device over a defined time interval. Reports of the group of reports can comprise respective ranks selected by the communication device 1002 during time instances within the defined time interval. Further to these implementations, the speed component 1014 can determine a Doppler metric of the communication device 1002 based on respective layer indicators determined as a function of the respective ranks selected by the communication device 1002. In an example, to determine the Doppler metric, the speed component 1014 can determine a rate of change of the layer indicator over a time change determined based on the time instances within the defined time interval.

Based on the speed determined by the speed component 1014, the selection component 1016 can select a multiple input transmission mode for a transmission to the communication device 1002. Selection of a multiple input transmission mode by the selection component 1016 can result in a selected transmission mode. For example, if the speed component 1014 determines the speed is below a defined speed, the selection component 1016 can select a closed loop multiple input transmission mode. Alternatively, if the speed component 1014 determines the speed is at or above a defined speed, the selection component 1016 can select an open loop multiple input transmission mode. According to some implementations, the defined speed can comprise a Doppler frequency of about 320 Hz, however, the disclosed aspects are not limited to this value and other values can be utilized.

Based on the selection component 1016 determining the transmission mode is the open loop multiple input transmission mode, the communication component 1018 can transmit an indication, to the communication device 1002. The indication can inform the communication device 1002 that the transmission uses a precoder index that corresponds to a rank one precoder. The communication component 1018 can transmit the indication via radio resource control signaling.

Alternatively, or additionally, in response to the selected transmission mode being the open loop multiple input transmission mode, the precoder component 1020 can precode a resource block of the transmission with a rank one precoder.

According to some implementations, based on the selection component 1016 determining the transmission mode is the open loop multiple input transmission mode, the communication component 1018 can transmit an indication, to the communication device 1002. The indication can inform the communication device 1002 that there is no precoding matrix indicator associated with the transmission.

Further, the communication component 1018 can send the transmission to the communication device 1002 using the selected transmission mode. In an example, the communication component 1018 can send the transmission via a downlink control channel configured to operate according to a fifth generation wireless network communication protocol.

The transmitter/receiver component 1006 (and/or the communication component 1018) can be configured to transmit to, and/or receive data from, the network device 1004 (or the communication device 1002), other network devices, and/or other communication devices. Through the transmitter/receiver component 1006 (and/or the communication component 1018), the communication device 1002 (and/or the network device 1004) can concurrently transmit and receive data, can transmit and receive data at different times, or combinations thereof. According to some implementations, the transmitter/receiver component 1006 (and/or the communication component 1018) can facilitate communications between an identified entity associated with the communication device 1002 (e.g., an owner of the communication device 1002, a user of the communication device 1002, and so on) and another communication device (e.g., or an entity associated with the other communication device). Further, the transmitter/receiver component 1006 (and/or the communication component 1018) can be configured to receive, from the network device 1004 or other network devices, various content including multimedia content.

The at least one memory 1008 can be operatively connected to the at least one processor 1010. Further, the at least one memory 1022 can be operatively connected to the at least one processor 1024. The memories (e.g., the at least one memory 1008, the at least one memory 1022) can store executable instructions that, when executed by the processors (e.g., the at least one processor 1010, the at least one processor 1024) can facilitate performance of operations. Further, the processors can be utilized to execute computer executable components stored in the memories.

For example, the memories can store protocols associated with securely conveying layer indicators, selected transmission modes, and so on, as discussed herein. Further, the memories can facilitate action to control communication between the communication device 1002 and the network device 1004 such that the system 1000 can employ stored protocols and/or algorithms to achieve improved communications in a wireless network as described herein.

The memories can store respective protocols associated with securely conveying information, including information indicative of speed of a device, taking action to control communication between the communication device 1002 and the network device 1004, such that the system 1000 can employ stored protocols and/or algorithms to achieve improved communications in a wireless network as described herein. It should be appreciated that data stores (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

The processors can facilitate respective analysis of information related to transmitted information embedded in one or more messages in a communication network. The processors can be processors dedicated to analyzing and/or generating information received, a processor that controls one or more components of the wireless communication system 100, and/or a processor that both analyzes and generates information received and controls one or more components of the system 1000.

Further, the term network device (e.g., network node, network node device) is used herein to refer to any type of network node serving communication devices and/or connected to other network nodes, network elements, or another network node from which the communication devices can receive a radio signal. In cellular radio access networks (e.g., universal mobile telecommunications system (UMTS) networks), network nodes can be referred to as base transceiver stations (BTS), radio base station, radio network nodes, base stations, NodeB, eNodeB (e.g., evolved NodeB), and so on. In 5G terminology, the network nodes can be referred to as gNodeB (e.g., gNB) devices. Network nodes can also comprise multiple antennas for performing various transmission operations (e.g., MIMO operations). A network node can comprise a cabinet and other protected enclosures, an antenna mast, and actual antennas. Network nodes can serve several cells, also called sectors, depending on the configuration and type of antenna. Examples of network nodes (e.g., network device 1004) can include but are not limited to: NodeB devices, base station (BS) devices, access point (AP) devices, and radio access network (RAN) devices. The network nodes can also include multi-standard radio (MSR) radio node devices, comprising: an MSR BS, an eNode B, a network controller, a radio network controller (RNC), a base station controller (BSC), a relay, a donor node controlling relay, a base transceiver station (BTS), a transmission point, a transmission node, an Remote Radio Unit (RRU), a Remote Radio Head (RRH), nodes in distributed antenna system (DAS), and the like.

Figure 11:
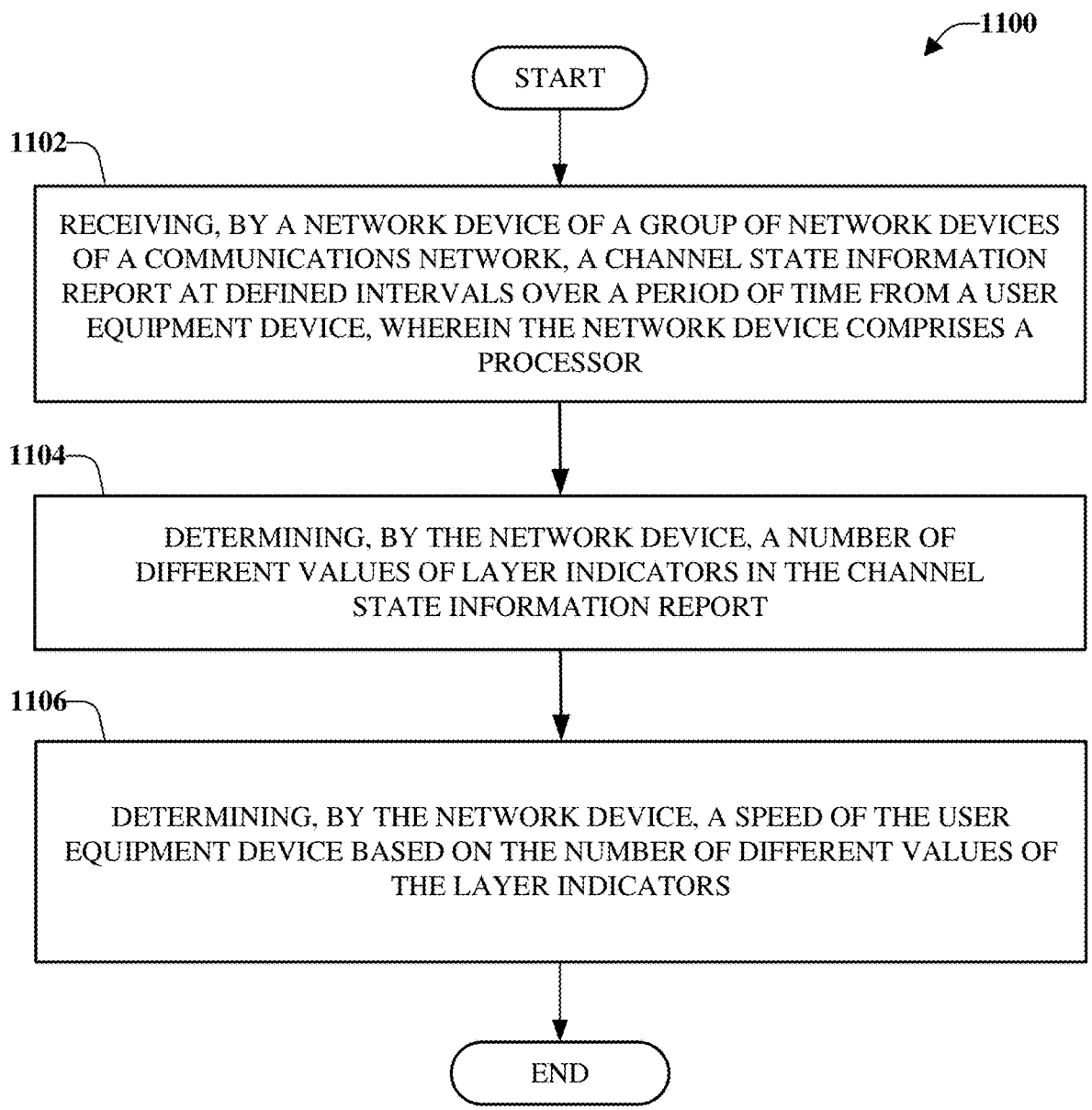
FIG. 11 illustrates a flow diagram of an example, non-limiting, computer-implemented method that facilitates improved performance based on inferred device speed for advanced networks in accordance with one or more embodiments described herein.

FIG. 11 illustrates a flow diagram of an example, non-limiting, computer-implemented method 1100 that facilitates improved performance based on inferred device speed for advanced networks in accordance with one or more embodiments described herein. Repetitive description of like elements employed in other embodiments described herein is omitted for sake of brevity.

In some implementations, a system comprising a processor can perform the computer-implemented method 1100 and/or other methods discussed herein. In other implementations, a device comprising a processor can perform the computer-implemented method 1100 and/or other methods discussed herein. In other implementations, a machine-readable storage medium, can comprise executable instructions that, when executed by a processor, facilitate performance of operations, which can be the operations discussed with respect to the computer-implemented method 1100 and/or other methods discussed herein. In further implementations, a computer readable storage device comprising executable instructions that, in response to execution, cause a system comprising a processor to perform operations, which can be operations discussed with respect to the computer-implemented method 1100 and/or other methods discussed herein.

At 1102 of the computer-implemented method 1100, a system operatively coupled to one or more processors, can receive a channel state information report at defined intervals over a period of time from a user equipment device (e.g., via the communication component 1018). Further, at 1104 of the computer-implemented method 1100, the system can determine a number of different values of layer indicators in the channel state information report (e.g., via the speed component 1014). A speed of the user equipment device can be determined at 1106 of the computer-implemented method 1100 (e.g., via the speed component 1014). The speed determination can be based on the number of different values of the layer indicators.

Figure 12:
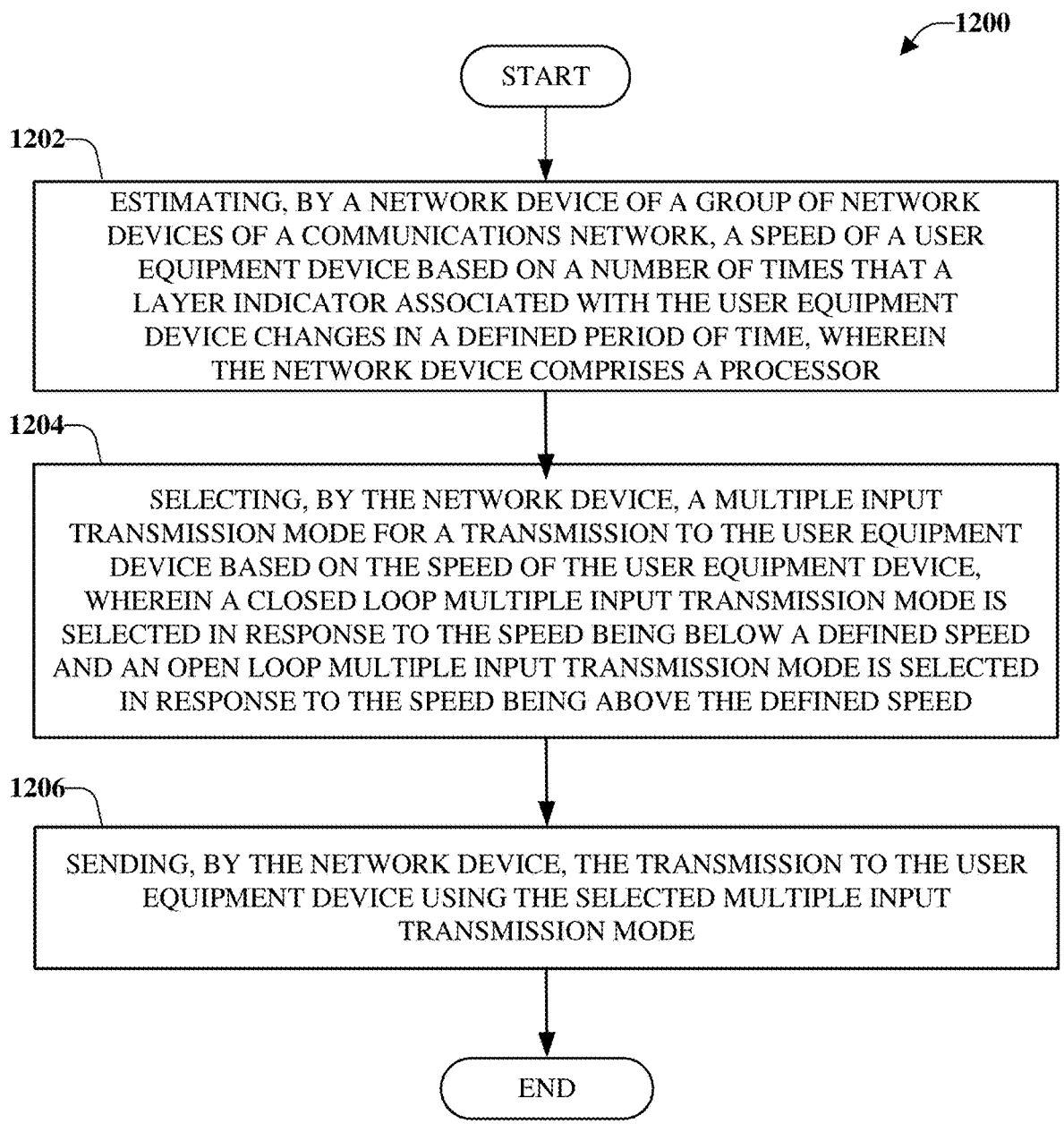
FIG. 12 illustrates a flow diagram of an example, non-limiting, computer-implemented method that facilitates selection of a transmission mode for improved performance based on device speed in accordance with one or more embodiments described herein.

FIG. 12 illustrates a flow diagram of an example, non-limiting, computer-implemented method 1200 that facilitates selection of a transmission mode for improved performance based on device speed in accordance with one or more embodiments described herein. Repetitive description of like elements employed in other embodiments described herein is omitted for sake of brevity.

In some implementations, a system comprising a processor can perform the computer-implemented method 1100, the computer-implemented method 1200, and/or other methods discussed herein. In other implementations, a device comprising a processor can perform the computer-implemented method 1100, the computer-implemented method 1200, and/or other methods discussed herein. In other implementations, a machine-readable storage medium, can comprise executable instructions that, when executed by a processor, facilitate performance of operations, which can be the operations discussed with respect to the computer-implemented method 1100, the computer-implemented method 1200, and/or other methods discussed herein. In further implementations, a computer readable storage device comprising executable instructions that, in response to execution, cause a system comprising a processor to perform operations, which can be operations discussed with respect to the computer-implemented method 1100, the computer-implemented method 1200, and/or other methods discussed herein.

At 1202 of the computer-implemented method 1200, a system operatively coupled to one or more processors, can estimate a speed of a user equipment device (e.g., via the speed component 1014). The estimated speed can be based on a number of times that a layer indicator associated with the user equipment device changes in a defined period of time.

Further, at 1204 of the computer-implemented method 1200, the system can select a multiple input transmission mode for a transmission to the user equipment device based on the speed of the user equipment device (e.g., via the selection component 1016). For example, a closed loop multiple input transmission mode can be selected in response to the speed failing to satisfy a defined speed and an open loop multiple input transmission mode can be selected in response to the speed satisfying the defined speed.

In an example, the computer-implemented method 1200 can include implementing a first demodulation reference signal and a second demodulation reference signal based on a second determination that the speed of the user equipment device satisfies a second defined speed different from the first defined speed.

The transmission can be sent to the user equipment device, at 1206 of the computer-implemented method 1200 using the selected multiple input transmission mode (e.g., via the communication component 1018). In an example, a signal can be sent that instructs the user equipment device to use wide-band channel state information reporting based on the speed of the user equipment device being a first speed. In another example, a signal can be sent that instructs the user equipment device to use sub-band channel station information reporting based on the speed of the user equipment device being the first speed.

According to some implementations, the computer-implemented method 1200 can include determining a configuration mode for the user equipment device based on the speed of the user equipment device. The configuration mode can comprise a L1/L2 signaling configuration mode or a radio resource control configuration mode.

Figure 13:
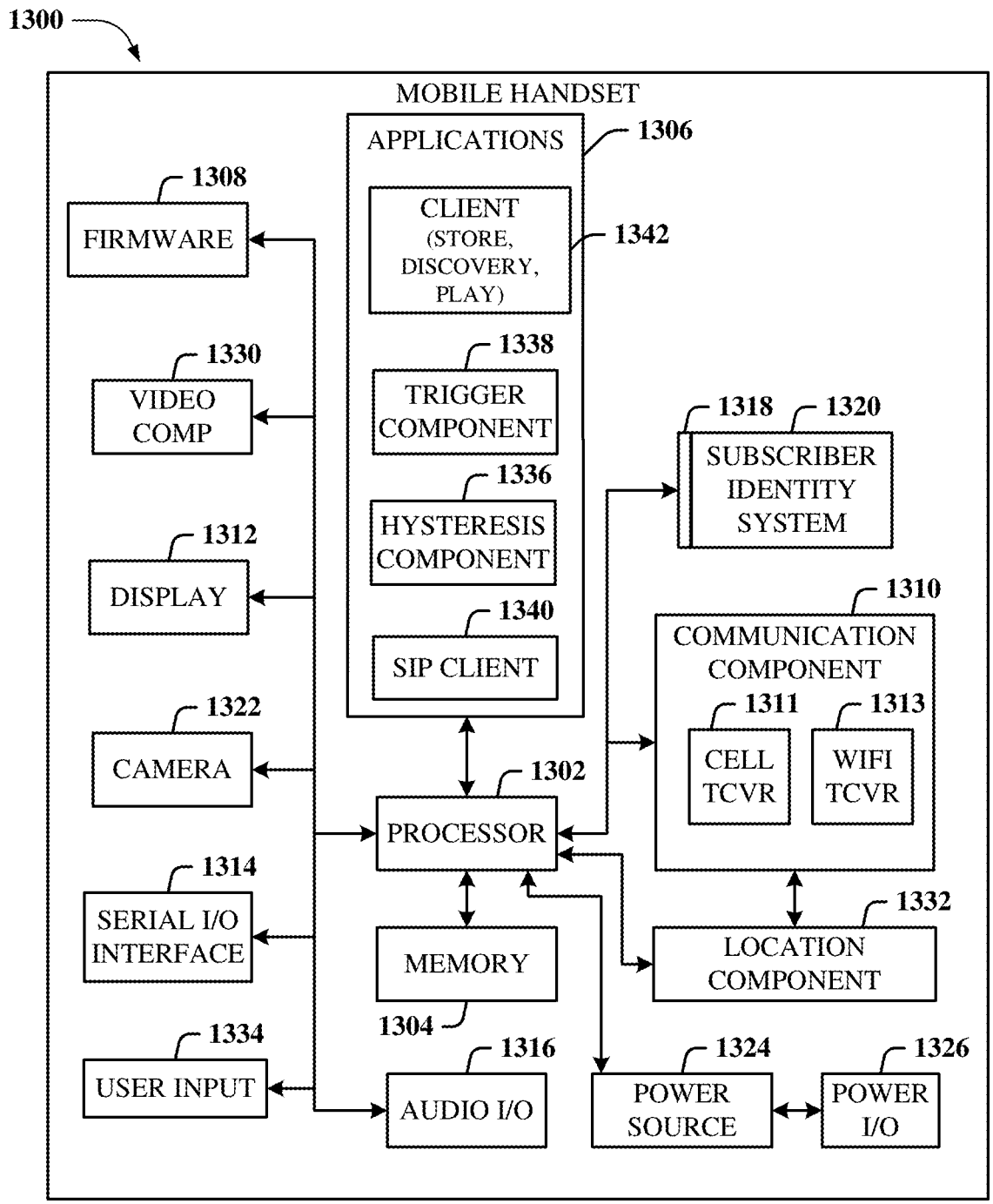
FIG. 13 illustrates an example, non-limiting, embodiment of a mobile network platform that can implement and exploit one or more aspects of the disclosed subject matter described herein.

FIG. 13 illustrates an example, non-limiting, embodiment 1300 of a mobile network platform 1310 that can implement and exploit one or more aspects of the disclosed subject matter described herein. Generally, wireless network platform 1310 can include components, e.g., nodes, gateways, interfaces, servers, or disparate platforms, that facilitate both packet-switched (PS) (e.g., internet protocol (IP), frame relay, asynchronous transfer mode (ATM) and circuit-switched (CS) traffic (e.g., voice and data), as well as control generation for networked wireless telecommunication. As a non-limiting example, wireless network platform 1310 can be included in telecommunications carrier networks, and can be considered carrier-side components as discussed elsewhere herein. Mobile network platform 1310 includes CS gateway node(s) 1312 which can interface CS traffic received from legacy networks like telephony network(s) 1340 (e.g., public switched telephone network (PSTN), or public land mobile network (PLMN)) or a signaling system #7 (SS7) network 1360. Circuit switched gateway node(s) 1312 can authorize and authenticate traffic (e.g., voice) arising from such networks. Additionally, CS gateway node(s) 1312 can access mobility, or roaming, data generated through SS7 network 1360; for instance, mobility data stored in a visited location register (VLR), which can reside in memory 1330. Moreover, CS gateway node(s) 1312 interfaces CS-based traffic and signaling and PS gateway node(s) 1318. As an example, in a 3GPP UMTS network, CS gateway node(s) 1312 can be realized at least in part in gateway GPRS support node(s) (GGSN). It should be appreciated that functionality and specific operation of CS gateway node(s) 1312, PS gateway node(s) 1318, and serving node(s) 1316, is provided and dictated by radio technology(ies) utilized by mobile network platform 1310 for telecommunication. Mobile network platform 1310 can also include the MMEs, HSS/PCRFs, SGWs, and PGWs disclosed herein.

In addition to receiving and processing CS-switched traffic and signaling, PS gateway node(s) 1318 can authorize and authenticate PS-based data sessions with served mobile devices. Data sessions can include traffic, or content(s), exchanged with networks external to the wireless network platform 1310, like wide area network(s) (WANs) 1350, enterprise network(s) 1370, and service network(s) 1380, which can be embodied in local area network(s) (LANs), can also be interfaced with mobile network platform 1310 through PS gateway node(s) 1318. It is to be noted that WANs 1350 and enterprise network(s) 1370 can embody, at least in part, a service network(s) like IP multimedia subsystem (IMS). Based on radio technology layer(s) available in technology resource(s) 1317, packet-switched gateway node(s) 1318 can generate packet data protocol contexts when a data session is established; other data structures that facilitate routing of packetized data also can be generated. To that end, in an aspect, PS gateway node(s) 1318 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 1300, wireless network platform 1310 also includes serving node(s) 1316 that, based upon available radio technology layer(s) within technology resource(s) 1317, convey the various packetized flows of data streams received through PS gateway node(s) 1318. It is to be noted that for technology resource(s) 1317 that rely primarily on CS communication, server node(s) can deliver traffic without reliance on PS gateway node(s) 1318; for example, server node(s) can embody at least in part a mobile switching center. As an example, in a 3GPP UMTS network, serving node(s) 1316 can be embodied in serving GPRS support node(s) (SGSN).

For radio technologies that exploit packetized communication, server(s) 1314 in wireless network platform 1310 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 1310. Data streams (e.g., content(s) that are part of a voice call or data session) can be conveyed to PS gateway node(s) 1318 for authorization/authentication and initiation of a data session, and to serving node(s) 1316 for communication thereafter. In addition to application server, server(s) 1314 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 1310 to ensure network's operation and data integrity in addition to authorization and authentication procedures that CS gateway node(s) 1312 and PS gateway node(s) 1318 can enact. Moreover, provisioning server(s) can provision services from external network(s) like networks operated by a disparate service provider; for instance, WAN 1350 or Global Positioning System (GPS) network(s) (not shown). Provisioning server(s) can also provision coverage through networks associated to wireless network platform 1310 (e.g., deployed and operated by the same service provider), such as femto-cell network(s) (not shown) that enhance wireless service coverage within indoor confined spaces and offload RAN resources in order to enhance subscriber service experience within a home or business environment by way of UE 1375.

It is to be noted that server(s) 1314 can include one or more processors configured to confer at least in part the functionality of macro network platform 1310. To that end, the one or more processor can execute code instructions stored in memory 1330, for example. It is should be appreciated that server(s) 1314 can include a content manager 1315, which operates in substantially the same manner as described hereinbefore.

In example embodiment 1300, memory 1330 can store information related to operation of wireless network platform 1310. Other operational information can include provisioning information of mobile devices served through wireless platform network 1310, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 1330 can also store information from at least one of telephony network(s) 1340, WAN 1350, enterprise network(s) 1370, or SS7 network 1360. In an aspect, memory 1330 can be, for example, accessed as part of a data store component or as a remotely connected memory store.

Figure 14:
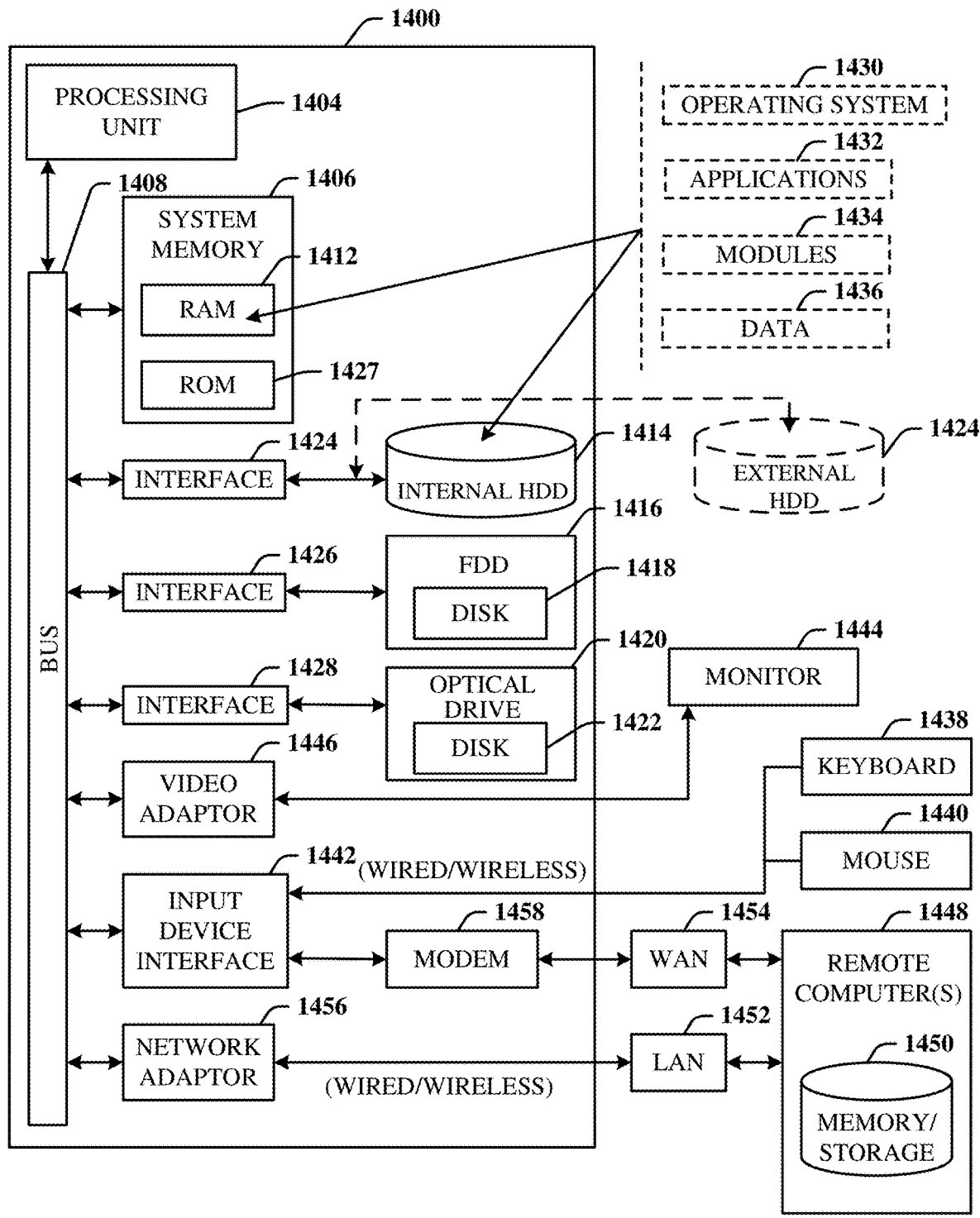
FIG. 14 illustrates a block diagram of a computer operable to execute the functions and operations performed in the described example embodiments.

Referring now to FIG. 14, illustrated is a block diagram of a computer 1400 operable to execute the functions and operations performed in the described example embodiments. The computer 1400 can provide networking and communication capabilities between a wired or wireless communication network and a server and/or communication device. In order to provide additional context for various aspects thereof, the following discussion are intended to provide a brief, general description of a suitable computing environment in which the various aspects of the embodiments can be implemented to facilitate the establishment of a transaction between an entity and a third party. While the description above is in the general context of computer-executable instructions that can run on one or more computers, those skilled in the art will recognize that the various embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the various embodiments can also be practiced in distributed computing environments where certain tasks are performed by remote processing devices that are linked through a communications network.

In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Referring now to FIG. 14, there is illustrated a block diagram of a computer 1400 operable to execute the functions and operations performed in the described example embodiments. For example, a network node (e.g., network node device 104, the network device 1004) may contain components as described in FIG. 14. The computer 1400 can provide networking and communication capabilities between a wired or wireless communication network and a server and/or communication device. In order to provide additional context for various aspects thereof, FIG. 14 and the following discussion are intended to provide a brief, general description of a suitable computing environment in which the various aspects of the embodiments can be implemented to facilitate the establishment of a transaction between an entity and a third party. While the description above is in the general context of computer-executable instructions that can run on one or more computers, those skilled in the art will recognize that the various embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the various embodiments can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 14, implementing various aspects described herein with regards to the end-user device can include a computer 1400, the computer 1400 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi-processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 includes read-only memory (ROM) 1427 and random access memory (RAM) 1412. A basic input/output system (BIOS) is stored in a non-volatile memory 1427 such as ROM, EPROM, EEPROM, which BIOS contains the basic routines that help to transfer information between elements within the computer 1400, such as during start-up. The RAM 1412 can also include a high-speed RAM such as static RAM for caching data.

The computer 1400 further includes an internal hard disk drive (HDD) 1414 (e.g., EIDE, SATA), which internal hard disk drive 1414 can also be configured for external use in a suitable chassis (not shown), a magnetic floppy disk drive (FDD) 1416, (e.g., to read from or write to a removable diskette 1418) and an optical disk drive 1420, (e.g., reading a CD-ROM disk 1422 or, to read from or write to other high capacity optical media such as the DVD). The hard disk drive 1414, magnetic disk drive 1416 and optical disk drive 1420 can be connected to the system bus 1408 by a hard disk drive interface 1424, a magnetic disk drive interface 1426 and an optical drive interface 1428, respectively. The interface 1424 for external drive implementations includes at least one or both of Universal Serial Bus (USB) and IEEE 1394 interface technologies. Other external drive connection technologies are within contemplation of the subject embodiments.

The drives and their associated computer-readable media provide nonvolatile storage of data, data structures, computer-executable instructions, and so forth. For the computer 1400 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1400, such as zip drives, magnetic cassettes, flash memory cards, cartridges, and the like, can also be used in the example operating environment, and further, that any such media can contain computer-executable instructions for performing the methods of the disclosed embodiments.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. It is to be appreciated that the various embodiments can be implemented with various commercially available operating systems or combinations of operating systems.

A user can enter commands and information into the computer 1400 through one or more wired/wireless input devices, e.g., a keyboard 1438 and a pointing device, such as a mouse 1440. Other input devices (not shown) may include a microphone, an IR remote control, a joystick, a game pad, a stylus pen, touch screen, or the like. These and other input devices are often connected to the processing unit 1404 through an input device interface 1442 that is coupled to the system bus 1408, but can be connected by other interfaces, such as a parallel port, an IEEE 1394 serial port, a game port, a USB port, an IR interface, etc.

A monitor 1444 or other type of display device is also connected to the system bus 1408 through an interface, such as a video adapter 1446. In addition to the monitor 1444, a computer 1400 typically includes other peripheral output devices (not shown), such as speakers, printers, etc.

The computer 1400 can operate in a networked environment using logical connections by wired and/or wireless communications to one or more remote computers, such as a remote computer(s) 1448. The remote computer(s) 1448 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1450 is illustrated. The logical connections depicted include wired/wireless connectivity to a local area network (LAN) 1452 and/or larger networks, e.g., a wide area network (WAN) 1454. Such LAN and WAN networking environments are commonplace in offices and companies, and facilitate enterprise-wide computer networks, such as intranets, all of which may connect to a global communications network, e.g., the Internet.

When used in a LAN networking environment, the computer 1400 is connected to the local network 1452 through a wired and/or wireless communication network interface or adapter 1456. The adapter 1456 may facilitate wired or wireless communication to the LAN 1452, which may also include a wireless access point disposed thereon for communicating with the wireless adapter 1456.

When used in a WAN networking environment, the computer 1400 can include a modem 1458, or is connected to a communications server on the WAN 1454, or has other means for establishing communications over the WAN 1454, such as by way of the Internet. The modem 1458, which can be internal or external and a wired or wireless device, is connected to the system bus 1408 through the input device interface 1442. In a networked environment, program modules depicted relative to the computer, or portions thereof, can be stored in the remote memory/storage device 1450. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprise a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A transmitter device, comprising:
   a processor; and
   a memory that stores executable instructions that, when executed by the processor, facilitate performance of operations, comprising:
      estimating a speed of a user equipment based on a number of times that a layer indicator associated with the user equipment changes during a defined period of time, wherein the estimating comprises receiving a group of reports from the user equipment over a defined time interval, and wherein the reports of the group of reports comprise respective ranks selected by the user equipment during time instances within the defined time interval; and
      selecting a multiple input transmission mode for a transmission to the user equipment based on the speed of the user equipment, resulting in a selected transmission mode, wherein a closed loop multiple input transmission mode is selected in response to the speed being below a defined speed and an open loop multiple input transmission mode is selected in response to the speed being above the defined speed.

2. The transmitter device of claim 1, wherein the operations further comprise:
   in response to the selected transmission mode being the open loop multiple input transmission mode, transmitting an indication, to the user equipment, that the transmission uses a precoder index that corresponds to a rank one precoder.

3. The transmitter device of claim 2, wherein the indication is transmitted via radio resource control signaling.

4. The transmitter device of claim 1, wherein the operations further comprise:
   in response to the selected transmission mode being the open loop multiple input transmission mode, precoding a resource block of the transmission with a rank one precoder.

5. The transmitter device of claim 1, wherein the operations further comprise:
   in response to the selected transmission mode being the open loop multiple input transmission mode, transmitting an indication, to the user equipment, wherein the indication informs the user equipment that there is no precoding matrix indicator associated with the transmission.

6. The transmitter device of claim 1, wherein the defined speed comprises a Doppler frequency of about 320 Hz.

7. The transmitter device of claim 1, wherein the operations further comprise:
   determining a Doppler metric of the user equipment based on respective layer indicators determined as a function of the respective ranks selected by the user equipment.

8. The transmitter device of claim 7, wherein the determining comprises determining a rate of change of the layer indicator over a time change determined based on the time instances within the defined time interval.

9. The transmitter device of claim 1, wherein the operations further comprise:
   sending the transmission to the user equipment using the selected transmission mode.

10. The transmitter device of claim 9, wherein the sending comprises sending the transmission via a downlink control channel configured to operate according to a fifth generation wireless communication network.

11. The transmitter device of claim 1, wherein the transmitter device is a fifth generation new radio device.

12. A method, comprising:
   receiving, by network equipment comprising a processor, a channel state information report at defined intervals over a period of time from a user equipment;
   determining, by the network equipment, a number of different values of layer indicators in the channel state information report;
   determining, by the network equipment, a speed of the user equipment based on the number of different values of the layer indicators;
   based on a first determination that the speed of the user equipment is at least a first defined speed, selecting, by the network equipment, an open loop multiple input transmission mode for a transmission to the user equipment; and
   implementing, by the network equipment, a first demodulation reference signal and a second demodulation reference signal based on a second determination that the speed of the user equipment is at least a second defined speed different from the first defined speed.

13. The method of claim 12, further comprising:
based on a third determination that the speed of the user equipment is below the first defined speed, selecting, by the network equipment, a closed loop multiple input transmission mode for a transmission to the user equipment.

14. The method of claim 12, further comprising:
sending, by the network equipment, a signal that instructs the user equipment to use wide-band channel state information reporting based on the speed of the user equipment being a first speed.

15. The method of claim 12, further comprising:
sending, by the network equipment, a signal that instructs the user equipment to use sub-band channel station information reporting based on the speed of the user equipment being a first speed.

16. The method of claim 12, further comprising:
determining, by the network equipment, a configuration mode for the user equipment based on the speed of the user equipment, wherein the configuration mode comprises a L1/L2 signaling configuration mode or a radio resource control configuration mode.

17. The method of claim 12, wherein the network equipment is configured to operate as fifth generation new radio network equipment.

18. The method of claim 12, wherein the user equipment is configured to operate as fifth generation new radio user equipment.

19. A non-transitory machine-readable medium, comprising executable instructions that, when executed by a processor, facilitate performance of operations, comprising:
determining a speed of a communication device based on a number of times reported layer indicators associated with the communication device changes in a defined interval, wherein the determining comprises receiving a group of reports from the communication device over a defined time interval, wherein the reports of the group of reports comprise respective ranks selected by the communication device during time instances within the defined time interval;
selecting a multiple input transmission mode for utilization during a transmission to the communication device based on the speed of the communication device, resulting in a selected multiple input transmission mode, wherein the selected multiple input transmission mode is a closed loop multiple input transmission mode in response to the speed being below a defined speed, and wherein the selected multiple input transmission mode is an open loop multiple input transmission mode in response to the speed being above the defined speed; and
facilitating a conveyance of the transmission to the communication device using the selected multiple input transmission mode.

20. The non-transitory machine-readable storage medium of claim 19, wherein the operations further comprise:
determining a Doppler metric of the communication device based on respective layer indicators of the reported layer indicators determined as a function of the respective ranks selected by the communication device, wherein the determining the Doppler metric of the communication device comprises determining a rate of change of between layer indicators of the reported layer indicators over a time change determined based on the time instances within the defined time interval.

* * * * *